United States Patent
Woods et al.

(10) Patent No.: US 7,653,133 B2
(45) Date of Patent: Jan. 26, 2010

(54) OVERLAPPED BLOCK MOTION COMPRESSION FOR VARIABLE SIZE BLOCKS IN THE CONTEXT OF MCTF SCALABLE VIDEO CODERS

(75) Inventors: John W. Woods, Clifton Park, NY (US); Yongjun Wu, Troy, NY (US); Robert A. Cohen, Troy, NY (US)

(73) Assignee: Rensselaer Polytechnic Institute (RPI), Troy, NY (US)

( * ) Notice: Subject to any disclaimer, the term of this patent is extended or adjusted under 35 U.S.C. 154(b) by 1202 days.

(21) Appl. No.: 10/965,237

(22) Filed: Oct. 14, 2004

(65) Prior Publication Data

US 2005/0078755 A1   Apr. 14, 2005

Related U.S. Application Data

(63) Continuation-in-part of application No. 10/864,833, filed on Jun. 9, 2004.

(60) Provisional application No. 60/512,120, filed on Oct. 17, 2003, provisional application No. 60/477,183, filed on Jun. 10, 2003.

(51) Int. Cl.
   *H04B 1/66* (2006.01)
(52) U.S. Cl. .................... 375/240.13; 375/240.16; 375/240.12; 375/240.15; 375/240.14; 348/699; 382/238; 382/236
(58) Field of Classification Search .......... 375/240.13, 375/240.16, 240.12, 240.15, 240.14; 348/699; 382/238, 236
   See application file for complete search history.

(56) References Cited

U.S. PATENT DOCUMENTS

| 4,849,810 | A | | 7/1989 | Ericsson |
| 5,311,310 | A | * | 5/1994 | Jozawa et al. .......... 375/240.13 |
| 5,408,274 | A | | 4/1995 | Chang et al. |
| 5,757,969 | A | | 5/1998 | Kim |

(Continued)

FOREIGN PATENT DOCUMENTS

KR   2001-0105361 A   11/2001

(Continued)

OTHER PUBLICATIONS

Ostermann and Zhang, "Video Processing and Communications", 2002, pp. 182-187.

(Continued)

*Primary Examiner*—Shawn An
(74) *Attorney, Agent, or Firm*—Sughrue Mion, PLLC

(57) ABSTRACT

A method, computer program product, and computer system for processing video frames. A current frame is divided into M blocks that include at least two differently sized blocks. M is at least 9. Each block in the current frame is classified as being a motion block or an I-BLOCK. Overlapped block motion compensation (OBMC) is performed on each block of the M blocks according to a predetermined scan order. The block on which OBMC is being performed is denoted as a self block. The OBMC is performed on the self block with respect to its neighbor blocks. The neighbor blocks consist of nearest neighbor blocks of the self block. Performing OBMC on the self block includes generating a weighting window for the self block and for each of its neighbor blocks.

60 Claims, 29 Drawing Sheets

U.S. PATENT DOCUMENTS

| | | | |
|---|---|---|---|
| 5,764,805 A * | 6/1998 | Martucci et al. | 382/238 |
| 6,108,448 A | 8/2000 | Song et al. | |
| 2003/0202597 A1 | 10/2003 | Turaga et al. | |
| 2003/0202598 A1 | 10/2003 | Turaga et al. | |
| 2003/0202599 A1 | 10/2003 | Turaga et al. | |
| 2004/0009785 A1 | 1/2004 | Turaga et al. | |

FOREIGN PATENT DOCUMENTS

| | | | |
|---|---|---|---|
| KR | 2002-0081777 A | 10/2002 | |
| WO | WO 01/49037 A1 | 7/2001 | |
| WO | WO 03/017672 A2 | 2/2003 | |

OTHER PUBLICATIONS

Peisong Chen, et al., "Bidirectional MC-EZBC With Lifting Implementation", 2004 IEEE, pp. 1183, 1194.

Michael T. Orchard, et al., "Overlapped Block Motion Compensation: An Estimation-Theoretic Approach", 1994 IEEE, pp. 693699.

S. Choi et al., "Motion-compensated 3-D subband coding of video", IEEE Trans. Image Processing, vol. 8, pp. 155-167, Feb. 1999.

Shih-Ta Hsiang, et al., "Embedded video coding using invertible motion compensated 3-D subband/wavelet filter bank", Signal Processing: Image Communication, vol. 16, pp. 705-724, May 2001.

J.-R. Ohm, "Three-dimensional subband coding with motion compensation,"IEEE Trans. Image Processing, vol. 3, pp. 559-571, Sep. 1994.

B. Pesquet-Popescu et al., "Three-dimensional lifting schemes for motion compensated video compression,"Proc. ICASSP, pp. 1793-1796, May 2001.

L. Luo et al., "Motion Compensated Lifting Wavelet and Its Application to Video Coding", Proc. ICME'01, Tokyo, Japan, Aug. 2001.

P. Chen et al., Improved MC-EZBC with Quarter-pixel Motion Vectors, ISO/IEC JTC1/SC29/WG1IMPEG2002/M8366, May 2002, Fairfax, VA.

T. Rusert, et al., Recent Improvements to MC-EZBC, ISO/IEC JTC1/SC29/WG1IMPEG2002/M9232, Dec. 2002, Awaji Island, Japan.

Y. Wu, et al., Recent Improvements to the MC-EZBC Video Coder, ISO/IEC JTC1/SC29/WG1IMPEG2003/M10396, Dec. 2003, Hawaii, USA.

* cited by examiner

I-block

|  |  |  |  |  |  |
|---|---|---|---|---|---|
|  |  | 5 | 6 |  |  |
|  | 4 | 1 | 2 | 7 |  |
|  | 10 | 3 | 8 |  |  |
|  |  | 9 |  |  |  |
|  |  |  |  |  |  |

| | u[0] | u[1] | u[2] | u[3] | |
|---|---|---|---|---|---|
| lf[0] | in[0] | in[1] | in[2] | in[3] | r[0] |
| lf[1] | in[4] | in[5] | in[6] | in[7] | r[1] |
| lf[2] | in[8] | in[9] | in[10] | in[11] | r[2] |
| lf[3] | in[12] | in[13] | in[14] | in[15] | r[3] |
| | lw[0] | lw[1] | lw[2] | lw[3] | |

FIG. 7A

| | | | |
|---|---|---|---|
| 5 | 4 | 3 | 2 |

45 →

40 ↘

| | | | |
|---|---|---|---|
| 5 | 3 | 2 | 1 |
| 3 | 3 | 2 | 2 |
| 4 | 4 | 3 | 2 |
| 5 | 4 | 3 | 3 |

| | | | |
|---|---|---|---|
| 5 | 4 | 3 | 2 |
| 5 | 4 | 3 | 2 |
| 5 | 4 | 3 | 2 |
| 5 | 4 | 3 | 2 |

| | | | |
|---|---|---|---|
| 0 | -1 | -1 | -1 |
| -2 | -1 | -1 | 0 |
| -1 | 0 | 0 | 0 |
| 0 | 0 | 0 | +1 |

| P11 | P12 | P13 | P14 | P15 | P16 | P17 | P18 | P19 |
|---|---|---|---|---|---|---|---|---|
| P21 | P22 | P23 | P24 | P25 | P26 | P27 | P28 | P29 |
| P31 | P32 | P33 | P34 | P35 | P36 | P37 | P38 | P39 |
| P41 | P42 | P43 | P44 | P45 | P46 | P47 | P48 | P49 |
| P51 | P52 | P53 | P54 | P55 | P56 | P57 | P58 | P59 |
| P61 | P62 | P63 | P64 | P65 | P66 | P67 | P68 | P69 |
| P71 | P72 | P73 | P74 | P75 | P76 | P77 | P78 | P79 |
| P81 | P82 | P83 | P84 | P85 | P86 | P87 | P88 | P89 |
| P91 | P92 | P93 | P94 | P95 | P96 | P97 | P98 | P99 |

*FIG. 9A*

| P11 | P12 | P13 | P14 | P15 | P16 | P17 | P18 | P19 |
|---|---|---|---|---|---|---|---|---|
| P21 | P22 | P23 | P24 | P25 | P26 | P27·Q0 | P28 | P29 |
| P31 | P32 | P33 | P34 | P35 | P36·Q1 | P37 | P38 | P39 |
| P41 | P42 | P43 | P44 | P45·Q2 | P46 | P47 | P48 | P49 |
| P51 | P52 | P53 | P54 | P55·Q3 | P56 | P57 | P58 | P59 |
| P61 | P62 | P63·Q4 | P64 | P65 | P66 | P67 | P68 | P69 |
| P71 | P72 | P73 | P74 | P75 | P76 | P77 | P78 | P79 |
| P81 | P82 | P83 | P84 | P85 | P86 | P87 | P88 | P89 |
| P91 | P92 | P93 | P94 | P95 | P96 | P97 | P98 | P99 |

| P11 | P12 | P13 | P14 | P15 | P16 | P17 | P18 | P19 |
|---|---|---|---|---|---|---|---|---|
| P21 | P22 | P23 | P24 | P25 | P26 | P27 | P28 | P29 |
| P31 | P32 | P33 | P34 | P35 | P36 | P37 | P38 | P39 |
| P41 | P42 | P43 | P44 | P45 | P46 | P47 | P48 | P49 |
| P51 | P52 | P53 | P54 | P55 | P56 | P57 | P58 | P59 |
| P61 | P62 | P63 | P64 | P65 | P66 | P67 | P68 | P69 |
| P71 | P72 | P73 | P74 | P75 | P76 | P77 | P78 | P79 |
| P81 | P82 | P83 | P84 | P85 | P86 | P87 | P88 | P89 |
| P91 | P92 | P93 | P94 | P95 | P96 | P97 | P98 | P99 |

$$\begin{bmatrix} 1 & 2 & 2 & 1 \\ 0 & 0 & 0 & 0 \\ 0 & 0 & 0 & 0 \\ 0 & 0 & 0 & 0 \end{bmatrix} \text{UPPER}\ \underline{274B}$$

$$\begin{bmatrix} 1 & 0 & 0 & 0 \\ 2 & 0 & 0 & 0 \\ 2 & 0 & 0 & 0 \\ 1 & 0 & 0 & 0 \end{bmatrix} \text{LEFT}\ \underline{273B} \qquad \begin{bmatrix} 2 & 2 & 2 & 2 \\ 2 & 4 & 4 & 2 \\ 2 & 4 & 4 & 2 \\ 2 & 2 & 2 & 2 \end{bmatrix} \text{SELF,}\ \underline{270B} \qquad \begin{bmatrix} 0 & 0 & 0 & 1 \\ 0 & 0 & 0 & 2 \\ 0 & 0 & 0 & 2 \\ 0 & 0 & 0 & 1 \end{bmatrix} \text{(2) RIGHT}\ \underline{271B}$$

$$\begin{bmatrix} 0 & 0 & 0 & 0 \\ 0 & 0 & 0 & 0 \\ 0 & 0 & 0 & 0 \\ 1 & 2 & 2 & 1 \end{bmatrix} \text{LOWER}\ \underline{272B}$$

*FIG. 17B*

$$\begin{bmatrix} 2 & 2 & 2 & 3 & 3 & 2 & 2 & 2 \\ 1 & 1 & 1 & 2 & 2 & 1 & 1 & 1 \\ 1 & 1 & 1 & 1 & 1 & 1 & 1 & 1 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix} \text{UPPER } \underline{274C}$$

$$\begin{bmatrix} 2 & 1 & 1 & 0 & 0 & 0 & 0 \\ 2 & 1 & 1 & 0 & 0 & 0 & 0 \\ 2 & 1 & 1 & 0 & 0 & 0 & 0 \\ 3 & 2 & 1 & 0 & 0 & 0 & 0 \\ 3 & 2 & 1 & 0 & 0 & 0 & 0 \\ 2 & 1 & 1 & 0 & 0 & 0 & 0 \\ 2 & 1 & 1 & 0 & 0 & 0 & 0 \\ 2 & 1 & 1 & 0 & 0 & 0 & 0 \end{bmatrix} \text{LEFT } \underline{273C} \quad \begin{bmatrix} 4 & 5 & 5 & 5 & 5 & 5 & 4 \\ 5 & 6 & 6 & 6 & 6 & 6 & 5 \\ 5 & 6 & 6 & 7 & 7 & 6 & 6 & 5 \\ 5 & 6 & 7 & 8 & 8 & 7 & 6 & 5 \\ 5 & 6 & 7 & 8 & 8 & 7 & 6 & 5 \\ 5 & 6 & 6 & 7 & 7 & 6 & 6 & 5 \\ 5 & 6 & 6 & 6 & 6 & 6 & 5 \\ 4 & 5 & 5 & 5 & 5 & 5 & 4 \end{bmatrix} \text{SELF } \underline{270C} \quad \begin{bmatrix} 0 & 0 & 0 & 0 & 0 & 1 & 1 & 2 \\ 0 & 0 & 0 & 0 & 0 & 1 & 1 & 2 \\ 0 & 0 & 0 & 0 & 0 & 1 & 1 & 2 \\ 0 & 0 & 0 & 0 & 0 & 1 & 2 & 3 \\ 0 & 0 & 0 & 0 & 0 & 1 & 2 & 3 \\ 0 & 0 & 0 & 0 & 0 & 1 & 1 & 2 \\ 0 & 0 & 0 & 0 & 0 & 1 & 1 & 2 \\ 0 & 0 & 0 & 0 & 0 & 1 & 1 & 2 \end{bmatrix} \text{RIGHT } \underline{271C}$$

$$\begin{bmatrix} 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 1 & 1 & 1 & 1 & 1 & 1 & 1 & 1 \\ 1 & 1 & 1 & 2 & 2 & 1 & 1 & 1 \\ 2 & 2 & 2 & 3 & 3 & 2 & 2 & 2 \end{bmatrix} \text{LOWER } \underline{272C}$$

*FIG. 18A*

$$\text{UPPER } 274D \begin{bmatrix} 2.5 & 3.0 & 3.0 & 4.5 & 4.5 & 3.0 & 3.0 & 2.5 \\ 1.5 & 1.5 & 1.5 & 3.0 & 3.0 & 1.5 & 1.5 & 1.5 \\ 1.5 & 1.5 & 1.5 & 1.5 & 1.5 & 1.5 & 1.5 & 1.5 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

SELF 270D $$\text{LEFT } 273D \begin{bmatrix} 2.5 & 1.5 & 1.5 & 0 & 0 & 0 & 0 & 0 \\ 3.0 & 1.5 & 1.5 & 0 & 0 & 0 & 0 & 0 \\ 3.0 & 1.5 & 1.5 & 0 & 0 & 0 & 0 & 0 \\ 4.5 & 3.0 & 1.5 & 0 & 0 & 0 & 0 & 0 \\ 4.5 & 3.0 & 1.5 & 0 & 0 & 0 & 0 & 0 \\ 3.0 & 1.5 & 1.5 & 0 & 0 & 0 & 0 & 0 \\ 3.0 & 1.5 & 1.5 & 0 & 0 & 0 & 0 & 0 \\ 2.5 & 1.5 & 1.5 & 0 & 0 & 0 & 0 & 0 \end{bmatrix} \begin{bmatrix} 3.0 & 3.5 & 3.5 & 3.5 & 3.5 & 3.5 & 3.5 & 3.0 \\ 3.5 & 5.0 & 5.0 & 5.0 & 5.0 & 5.0 & 5.0 & 3.5 \\ 3.5 & 5.0 & 5.0 & 6.5 & 6.5 & 5.0 & 5.0 & 3.5 \\ 3.5 & 5.0 & 6.5 & 8.0 & 8.0 & 6.5 & 5.0 & 3.5 \\ 3.5 & 5.0 & 6.5 & 8.0 & 8.0 & 6.5 & 5.0 & 3.5 \\ 3.5 & 5.0 & 5.0 & 6.5 & 6.5 & 5.0 & 5.0 & 3.5 \\ 3.5 & 5.0 & 5.0 & 5.0 & 5.0 & 5.0 & 5.0 & 3.5 \\ 3.0 & 3.5 & 3.5 & 3.5 & 3.5 & 3.5 & 3.5 & 3.0 \end{bmatrix} \begin{bmatrix} 0 & 0 & 0 & 0 & 0 & 1.5 & 1.5 & 2.5 \\ 0 & 0 & 0 & 0 & 0 & 1.5 & 1.5 & 3.0 \\ 0 & 0 & 0 & 0 & 0 & 1.5 & 1.5 & 3.0 \\ 0 & 0 & 0 & 0 & 0 & 1.5 & 3.0 & 4.5 \\ 0 & 0 & 0 & 0 & 0 & 1.5 & 3.0 & 4.5 \\ 0 & 0 & 0 & 0 & 0 & 1.5 & 1.5 & 3.0 \\ 0 & 0 & 0 & 0 & 0 & 1.5 & 1.5 & 3.0 \\ 0 & 0 & 0 & 0 & 0 & 1.5 & 1.5 & 2.5 \end{bmatrix} \text{RIGHT } 271D$$

$$\text{BOTTOM } 272D \begin{bmatrix} 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 1.5 & 1.5 & 1.5 & 1.5 & 1.5 & 1.5 & 1.5 & 1.5 \\ 1.5 & 1.5 & 1.5 & 3.0 & 3.0 & 1.5 & 1.5 & 1.5 \\ 2.5 & 3.0 & 3.0 & 4.5 & 4.5 & 3.0 & 3.0 & 2.5 \end{bmatrix}$$

*FIG. 18B*

OVERLAPPED BLOCK MOTION COMPRESSION FOR VARIABLE SIZE BLOCKS IN THE CONTEXT OF MCTF SCALABLE VIDEO CODERS

RELATED APPLICATION

The present invention claims priority to U.S. Provisional Application No. 60/512,120, filed Oct. 17, 2003 and entitled "Overlapped Block Motion Compensation (OBMC) For MCTF-Type Scalable Video Coders" and is incorporated herein by reference in its entirety. The present invention is also a continuation-in-part of copending U.S. patent application Ser. No. 10/864,833, filed Jun. 9, 2004 and entitled "A Method For Processing I-BLOCKs Used With Motion Compensated Temporal Filtering" which claims priority to U.S. Provisional Application No. 60/477,183, filed Jun. 10, 2003.

BACKGROUND OF THE INVENTION

1. Technical Field

The present invention relates generally to a method, computer program product, and computer system for processing video frames, and more specifically to a method, system, computer program product, and computer system for performing overlapped block motion compensation (OBMC) for variable size blocks in the context of motion compensated temporal filtering (MCTF) scalable video coders.

2. Related Art

Currently used variable size block matching (VSBM) motion in the context of scalable video coders tends to create poor motion matches at block boundaries, resulting in low coding efficiency. Thus, there is a need for a higher accuracy of motion matches at block boundaries provided by VSBM in the context of scalable video coders than currently exists in the related art.

SUMMARY OF THE INVENTION

The present invention provides a method for processing video frames, said method comprising the steps of:

providing a current frame divided into blocks that include at least two differently sized blocks; and performing overlapped block motion compensation (OBMC) on each block, said block on which said OBMC is being performed being denoted as a self block, said performing OBMC comprising performing OBMC on the self block with respect to neighbor blocks of the self block, said neighbor blocks consisting of nearest neighbor blocks of the self block, said neighbor blocks comprising a first neighbor block, said performing OBMC on the self block comprising generating a weighting window for the self block and for each of its neighbor blocks.

The present invention provides a computer program product, comprising a computer usable medium having a computer readable program code embodied therein, said computer readable program code comprising an algorithm adapted to implement a method for processing video frames, said method comprising the steps of:

providing a current frame divided into blocks that include at least two differently sized blocks; and performing overlapped block motion compensation (OBMC) on each block, said block on which said OBMC is being performed being denoted as a self block, said performing OBMC comprising performing OBMC on the self block with respect to neighbor blocks of the self block, said neighbor blocks consisting of nearest neighbor blocks of the self block, said neighbor blocks comprising a first neighbor block, said performing OBMC on the self block comprising generating a weighting window for the self block and for each of its neighbor blocks.

The present invention provides a computer system comprising a processor and a computer readable memory unit coupled to the processor, said memory unit containing instructions that when executed by the processor implement a method for processing video frames, said method comprising the computer implemented steps of:

providing a current frame divided into blocks that include at least two differently sized blocks; and performing overlapped block motion compensation (OBMC) on each block, said block on which said OBMC is being performed being denoted as a self block, said performing OBMC comprising performing OBMC on the self block with respect to neighbor blocks of the self block, said neighbor blocks consisting of nearest neighbor blocks of the self block, said neighbor blocks comprising a first neighbor block, said performing OBMC on the self block comprising generating a weighting window for the self block and for each of its neighbor blocks.

The present invention advantageously provides a higher accuracy of motion matches at block boundaries provided by variable size block matching (VSBM) in the context of scalable video coders than currently exists in the related art.

BRIEF DESCRIPTION OF THE DRAWINGS

FIGS. 7A-7C illustrate spatial interpolation of an I-BLOCK for a case in which only one neighbor block is available, in accordance with embodiments of the present invention.

FIGS. 9A-9F illustrate directional spatial interpolation of an I-BLOCK, in accordance with embodiments of the present invention.

FIG. 17B illustrates 4×4 weighting windows, wherein a self block is an I-BLOCK, in accordance with embodiments of the present invention.

FIG. 18A illustrates 8×8 weighting windows, wherein a self block is a motion block, in accordance with embodiments of the present invention.

FIG. 18B illustrates 8×8 weighting windows, wherein a self block is an I-BLOCK, in accordance with embodiments of the present invention.

DETAILED DESCRIPTION OF THE INVENTION

Figure 1:
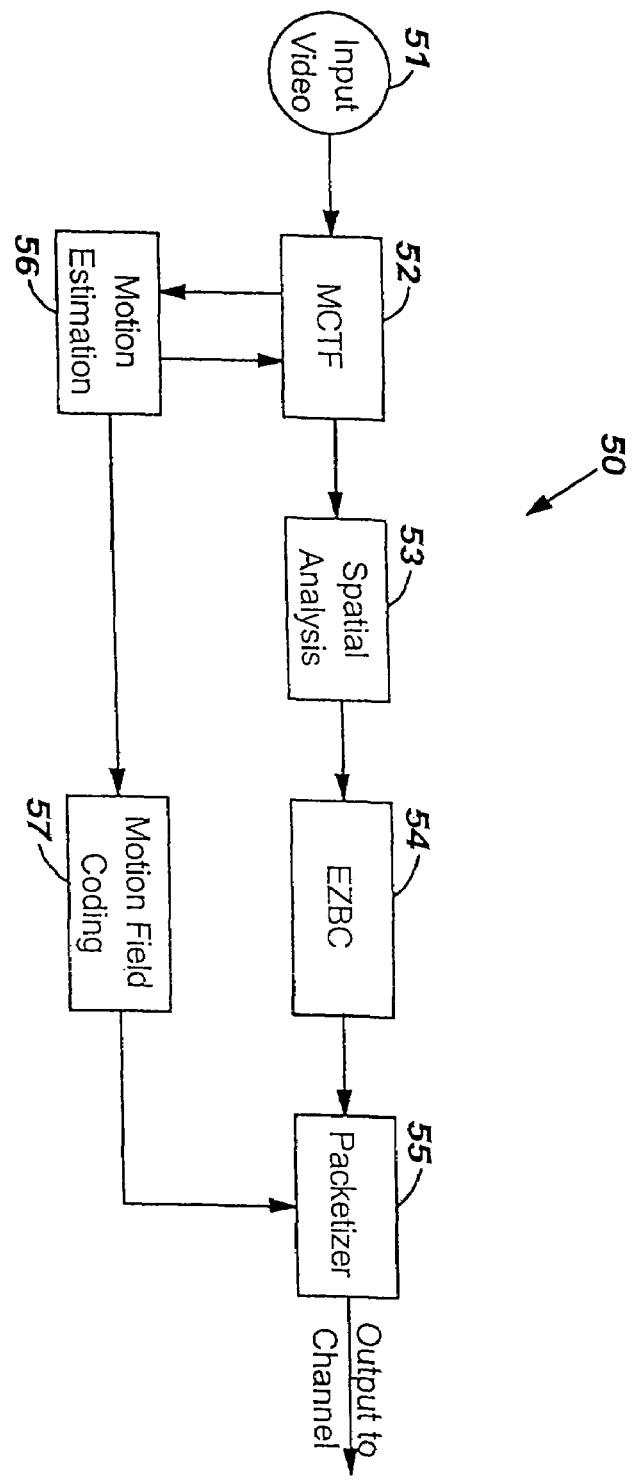
FIG. 1 depicts a video coding system comprising a Motion Compensated Temporal Filtering (MCTF) processor, in accordance with embodiments of the present invention.

The detailed description of the present invention is divided into the sections of: Introduction; Definitions; Motion Compensated Temporal Filtering (MCTF); Detecting and Processing I-BLOCKs; OBMC Processing; Shrinking Scheme; Reflecting Scheme; OBMC Weighting Window Algorithm; Iterating on OBMC; Modification of Lifting-Based MCTF; and Computer System.

Introduction

Video compression schemes remove redundant information from input video signals before their transmission, by encoding frames of the input video signals into compressed information that represents an approximation of the images comprised by the frames of the input video signals. Following the transmission of the compressed information to its destination, the video signals are reconstructed by decoding the approximation of the images from the compressed information. With temporal redundancy, pixel values are not independent but are correlated with their neighbors across successive frames of the input video signals.

In Moving Pictures Experts Group (MPEG) hybrid coding, temporal redundancy may be removed by motion-compensated prediction (MCP). A video signal is typically divided into a series of groups of pictures (GOP), where each GOP begins with an intra-coded frame (I) followed by an arrangement of forward predictive-coded frames (P) and bidirectional predicted frames (B). Both P-frames and B-frames are interframes. A target macroblock in a P-frame can be predicted from one or more past reference frames (forward prediction). Bidirectional prediction, also called motion-compensated (MC) interpolation, is an important feature of MPEG video. B-frames coded with bidirectional prediction use two reference frames, one in the past and one in the future. A target macroblock in a B-frame can be predicted from past reference frames (forward prediction) or from future reference frames (backward prediction), or by an average of these two predictions (interpolation). The target macroblock in either a P-frame or a B-frame can also be intra coded as an I-BLOCK or a P-BLOCK as defined infra.

Forward or backward prediction encodes data in a current input frame (i.e., picture) based upon the contents of a preceding or succeeding reference frame, respectively, in consideration of luminance and/or chrominance values at the pixels in both the current input frame and one or more reference frames. Thus the reference frames used for the predictive encoding are either preceding reference frames or succeeding reference frames. For a given input block of pixels (e.g., a 16×16 array of pixels) in the current input frame, the predictive encoding utilizes motion compensated prediction (MCP) to successively shift blocks in the reference frames, within a predetermined search range, to determine whether there is a 16×16 array of pixels found within a reference frame which has at least a given minimum degree of correlation with the input block. If the given minimum degree of correlation is determined to exist, then the amount and direction of displacement between the found 16×16 pixel array in the reference frame and the input block is obtained in the form of a motion vector (MV), with horizontal and vertical components. The respective values of the difference between the pixel values (e.g. luminance values alone or luminance and chrominance values) of the input block and the corresponding pixels within the found 16×16 array of pixels in the reference frame are motion compensated prediction error values, sometimes called prediction residuals or simply residuals. As stated supra, prediction from a preceding reference frame is referred to as forward prediction, and from a succeeding reference frame is referred to as backward prediction. If no correlated 16×16 blocks in the reference frames are found within the search range, then the input block may be intra-coded within the input frame, and is referred to as an I-BLOCK. With bidirectional prediction, values for the input block may be predicted based on 16×16 blocks of pixels within both preceding and succeeding reference frames, respectively. Note that the preceding discussion of 16×16 pixel blocks is merely illustrative and the scope of the present invention includes pixel blocks of any pixel array size. With variable size block matching (VSBM), for example, the block sizes are at least 4×4.

An unconnected block within a current input frame is classified to be either an I-BLOCK or a P-BLOCK. An I-BLOCK is defined as an input block in the current input frame that does not have sufficient correlation (e.g., a given minimum degree of correlation) with a corresponding block of pixels in the reference frame that is being used for forward or backward prediction in relation to the frame. Due to the lack of sufficient correlation, an I-BLOCK is encoded entirely within the given frame independent of a reference frame. A P-BLOCK is encoded: by forward prediction from the reference frame under the assumption that the reference frame precedes the given frame; by backward prediction from the reference frame under the assumption that the reference frame succeeds the given frame; or by bidirectional prediction using both a preceding and succeeding reference frame.

An example of an I-BLOCK is a block of newly uncovered pixels in the current input frame having no corresponding pixels in the preceding frame. Other examples of I-BLOCKs include poorly matched motion blocks such as, inter alia, a block of partially covered or partially occluded pixels in the current input frame wherein said block does not have sufficient correlation with a corresponding block of pixels in the reference frame. The present invention provides a method of determining and encoding I-BLOCKs.

The present invention is directed to the quality of the motion, since Motion Compensated Temporal Filtering (MCTF) is rather sensitive to said quality. The conventionally used block based motion in MPEG video standards is not of sufficient high quality to avoid the creation of artifacts in the lower frame rate videos output by the MCTF and resultant scalable video coder. Currently, even VSBM is not sufficient to reliably avoid artifacts. In contrast, the present invention provides a method of determining and coding a more smooth and consistent motion for MCTF use.

Definitions

The following definitions apply herein to the description of the present invention:

"Video coding system" is a system that encodes video data.

"Video coder" is an algorithm which reduces the number of bits necessary to store a video clip by removing redundancy and introducing controlled distortion.

"Subband/wavelet coder" is a video coder that uses the subband/wavelet transformation in the process of redundancy reduction.

"Temporal correlation" is a correlation between pixels in adjacent or nearby frames.

"Spatial correlation" is a correlation between pixels in the same frame.

"Motion estimation" is estimation of a motion or displacement vector that locates a matching block in another frame.

"Motion Compensation" (MC) is a process of actually an alignment of a block in the present frame with a matching block in a different frame.

Figure 2:
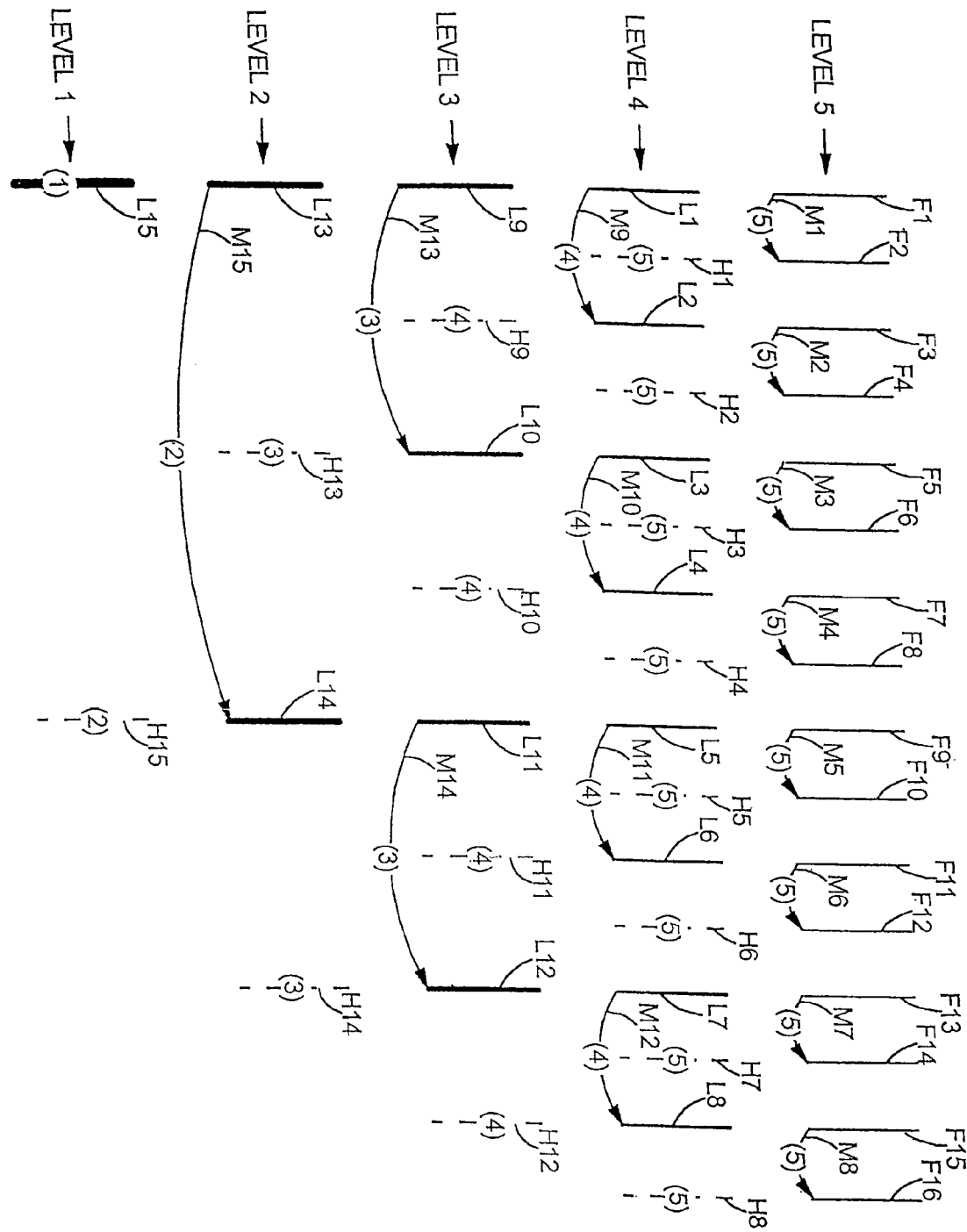
FIG. 2 depicts the MCTF process implemented by the MCTF processor of FIG. 1, in accordance with embodiments of the present invention.

"Motion Compensated Temporal filtering" (MCTF) is a process of filtering a block or array of pixels along the time axis (i.e., motion trajectory) in a manner to be described infra in conjunction with FIG. 2.

"Temporal low frame" is a frame containing the spatial low frequencies that are common in a pair (or larger set) of frames.

"Temporal high frame" is a frame containing the spatial high frequencies that constitute the MC difference in a pair (or larger set) of frames.

"Temporal redundancy" denotes a dependency between pixels in adjacent or nearby frames.

"Block matching" is a method that assigns one motion to a block of pixels. "Variable size block matching" (VSBM) is a block matching motion estimation using variable size blocks to better represent the motion. Block sizes may range, inter alia, from 4×4 to 64×64.

"Hierarchical VSBM" (HVSBM) is a motion estimation method that uses a hierarchy of spatial resolutions to perform the VSBM, progressing from lowest to highest (full) resolution.

"Overlapped block motion compensation" (OBMC) is a method of enhancing block-based motion to make the resulting motion based prediction smoother and reduce or eliminate the effect of motion vector discontinuities between neighboring blocks.

"Global motion vector" is a motion vector that is used for the entire frame, wherein the pertinent block size is equal to the frame size.

"Unconnected area" is an area of the image frame that does not have a corresponding region in the reference frames or a region where the motion is too complicated for the motion estimator to track properly.

"Motion compensated prediction" (MCP) is a data reduction technique, wherein motion vectors are used to warp a previously transmitted frame prior to its use as a prediction of the current frame, and only the resulting prediction error is quantized and transmitted for this frame.

"Displaced frame difference" (DFD) is an error resulting from a motion compensated prediction.

"Hybrid coder" is a video coder such as MPEG2 that makes use of MC prediction inside a feedback loop to temporally compress the data, and then a spatial transform coder to code the resulting prediction error.

Motion Compensated Temporal Filtering (MCTF)

Scalable video coding is an exploration activity in Moving Picture Experts Group (MPEG), which is one of subcommittees of International Organization for Standardization (ISO). The purpose of MPEG is to design international standards for the transmission and storage of combined audio and video signals. A key element in this is the compression of these audiovisual signals due to their large uncompressed size. A scalable video coder provides an embedded bit stream containing a whole range of bitrates, lower resolutions, and lower frame rates, in addition to the full frame rate and full resolution input to the scalable coder. With said embedding, the lower bitrate result is embedded in each of the higher bitrate streams.

FIG. 1 depicts a video coding system 50, in accordance with embodiments of the present invention. Input video 51 is received by a MCTF processor 52 and comprises a group of pictures (GOP) such as 16 input frames. Each frame has pixels, and each pixel has pixel value for the pixel characteristics of luminance and chrominance. For each block of data processed by the MCTF processor 52, the MCTF processor 52 needs motion information in the form of a motion vector. Accordingly, the Input Video 51 data is sent from the MCTF processor 52 to a Motion Estimation 56 block which determines the motion vectors and sends the determined motion vectors back up to the MCTF processor 52 to perform the motion compensated temporal filtering. In addition, the motion information is coded in the Motion Field Coding processor 57, and then transmitted to the Packetizer 55.

The MCTF processor 52 generates output frames comprising one temporal low frame and multiple temporal high frames of transformed pixel values, derived from the input frames of the Input Video 51 as will be described infra in conjunction with FIG. 2. The generated output frames are processed by Spatial Analysis 53 by being analyzed spatially with a subband wavelet coder, namely a discrete wavelet transform. By using the MCTF processor 52, the video coding system 50 does not suffer the drift problem exhibited by hybrid coders that have feedback loops.

The Spatial Analysis 53 decomposes the generated output frames (i.e., one temporal low frame and multiple temporal high frames) into one low frequency band and bands having increasing scales of higher and higher frequency. Thus, the Spatial Analysis 53 performs a spatial pixel transformation to derive spatial subbands in a manner that is analogous to pixel transformation performed by the MCTF processor 52 in the time domain. The output of Spatial Analysis 53 is uncompressed floating point data and many of the subbands may comprise mostly near zero values.

These spatial subbands in space generated by the Spatial Analysis 53 are sent to EZBC (Embedded Zero Block Coder) 54 which is one of a family of subband/wavelet coders that exploit temporal correlation but is fully embedded in quality/bit-rate, spatial resolution, and frame rate. The EZBC 54 algorithm provides the basic scalability properties by individually coding each spatial resolution and temporal high subband. The EZBC 54 includes a compression block that quantizes the subband coefficients and assigns bits to them. Said quantizing converts the floating point output of Spatial Analysis 53 to a binary bit representation, followed by truncating the binary bit representation to discard relatively insignificant bits such that no more than negligible distortion is generated from said truncation. The EZBC 54 is an adaptive arithmetic coder which converts the fixed bit strings into variable length strings, thereby achieving further compression. Thus, the EZBC 54 is both a quantizer and a variable length coder called a Conditional Adaptive Arithmetic Coder. Whereas the quantizer is throwing away bits, the variable length coder compresses output from the quantizer losslessly. The bit streams generated by the EZBC 54 are interleaved and sent to the Packetizer 55. The EZBC coder can be substituted by another suitable embedded or layered coder, e.g. JPEG 2000 and others.

The Packetizer 55 combines the bits of the streams generated by the EZBC 54 with the bits of motion vectors (needed for doing decoding later) transmitted from the Motion Field Coding 57 and breaks the combination of bits up into packets of desired sizes (e.g., internet packets of 500 kilobytes or less). The Packetizer 55 subsequently sends the packets over a communication channel to a destination (e.g., a storage area for storing the encoded video information).

FIG. 2 depicts the MCTF process implemented by the MCTF processor 52 of FIG. 1 for an example GOP size of 16 frames, in accordance with embodiments of the present invention. FIG. 2 shows 5 levels in the MCTF process of successive filtering, namely levels 5, 4, 3, 2, and 1 having 16, 8 4, 2, and 1 frames therein, respectively. Thus, each level N contains $2^{N-1}$ frames for N=1, 2, 3, 4, 5. Level 5 contains the 16 input frames of the Input Video 51 of FIG. 1, namely input frames F1, F2, . . . , F16 ordered in the direction of increasing time from left to right. MC temporal filtering is performed on pairs of frames to produce temporal low (t-L) and high (t-H) subband frames at the next lower temporal scale or frame rate. In FIG. 2, solid lines indicate the temporal low frames and dashed lines indicate the temporal high frames. At each temporal scale, curved lines indicate the corresponding motion vectors.

The MC temporal filtering is performed four times in FIG. 2 to generate 5 temporal scales or frame rates, the original frame rate and four lower frame rates. The frame rates generated are full rate, ½ full rate, ¼ full rate, ⅛ full rate, and 1/16 full frame rate at levels 5, 4, 3, 2, and 1, respectively. Thus, if the input frame rate were 32 frames per second (fps), then the lowest frame rate out is 2 fps at level 1. In FIG. 2, the lowest frame rate is denoted (1), the next higher frame rate is denoted as (2), etc.

In motion estimation and associated temporal filtering from level 5 to level 4, the Motion Estimation 56 of FIG. 1 performs: motion estimation from: F1 to F2, F3 to F4, F5 to F6, F7 to F8, F9 to F10, F11 to F12, F13 to F14, and F15 to F16 and determines the associated motion vectors M1, M2, M3, M4, M5, M6, M7, and M8, respectively. The MCTF processor 52 of FIG. 1 performs: temporal filtering on frames F1 and F2 to generate temporal low frame L1 and temporal high frame H1; temporal filtering on frames F3 and F4 to generate temporal low frame L2 and temporal high frame H2; temporal filtering on frames F5 and F6 to generate temporal low frame L3 and temporal high frame H3; temporal filtering on frames F7 and F8 to generate temporal low frame L4 and temporal high frame H4; temporal filtering on frames F9 and F10 to generate temporal low frame L5 and temporal high frame H5; temporal filtering on frames F11 and F12 to generate temporal low frame L6 and temporal high frame H6; temporal filtering on frames F13 and F14 to generate temporal low frame L7 and temporal high frame H7; and temporal filtering on frames F15 and F16 to generate temporal low frame L8 and temporal high frame H18. Generally, the frames being temporally filtered into temporal low and temporal high frames are called "child frames". For examples, the F1 and F2 frames are child frames of the L1 and H1 frames. Generally, if corresponding pixel values in the child frames are $V_A$ and $V_B$, then the corresponding pixel values in the temporal low and temporal high frames are proportional to $V_A+V_B$ and $V_A-V_B$, respectively, in the special case where Haar filters are used for temporal filtering. Thus, pixel values in temporal low frames are proportional to the average of the corresponding pixel values in the child frames. In contrast, pixel values in temporal high frames are proportional to the difference between corresponding pixel values in the child frames. Thus, if the pixel values in the child frames are close to each other, then the pixels in the temporal high frames generally have a low energy (i.e., a large number of near zero values) and are therefore highly compressible.

In motion estimation and associated temporal filtering from level 4 to level 3, the Motion Estimation 56 of FIG. 1 further performs: motion estimation from: L1 to L2, L3 to L4, L5 to L6, and L7 to L8 and determines the associated motion vectors M9, M10, M11, and M12, respectively. The MCTF processor 52 of FIG. 1 further performs: temporal filtering on frames L1 and L2 to generate temporal low frame L9 and temporal high frame H9; temporal filtering on frames L3 and L4 to generate temporal low frame L10 and temporal high frame H10; temporal filtering on frames L5 and L6 to generate temporal low frame L11 and temporal high frame H11; and temporal filtering on frames L7 and L8 to generate temporal low frame L12 and temporal high frame H12.

In motion estimation and associated temporal filtering from level 3 to level 2, the Motion Estimation 56 of FIG. 1 further performs: motion estimation from: L9 to L10 and L11 to L12 and determines the associated motion vectors M13 and M14, respectively. The MCTF processor 11 of FIG. 1 further performs: temporal filtering on frames L9 and L10 to generate temporal low frame L13 and temporal high frame H13; and temporal filtering on frames L11 and L12 to generate temporal low frame L14 and temporal high frame H14.

In motion estimation and associated temporal filtering from level 2 to level 1, the Motion Estimation 56 of FIG. 1 further performs: motion estimation from: L13 to L14 determines the associated motion vector M15. The MCTF processor 52 of FIG. 1 further performs: temporal filtering on frames L13 and L14 to generate temporal low frame L15 and temporal high frame H15.

As a result of the MCTF of FIG. 2, the 16 frames in this 5 level example, consisting of the temporal low frame L15 and the temporal high frames H1, H2, ..., H15 are transmitted as output from the MCTF processor 52 to the Spatial Analysis 12 of FIG. 1. Since the temporal high frames H1, H2, ..., H15 may comprise a large number of near zero values, as explained supra, the temporal high frames H1, H2, ..., H15 frames are amenable to being highly compressed.

Given frames L15, H1, H2, ..., H15, the frames in Levels 2, 3, 4, and 5 may be regenerated by sequentially reversing the process that generated frames L15, H1, H2, ..., H15. For example, frames L15 and H15 of Level 1 may be mathematically combined to regenerate frames L13 and L14 of Level 2. Similarly, frames L13 and H13 of Level 2 may be mathematically combined to regenerate frames L9 and L10 of Level 3, and frames L14 and H14 of Level 2 may be mathematically combined to regenerate frames L11 and L12 of Level 3. This process may be sequentially continued until frames F1, F2, ..., F16 of Level 1 are regenerated. Since the compression performed by the EZBC 54 of FIG. 1 is lossy, the regenerated frames in Levels 2-5 will be approximately, but not exactly, the same as the original frames in Levels 2-5 before being temporally filtered.

Detecting and Processing I-BLOCKs

Because the MCTF decomposition is applied similarly to multiple pairs of frames as explained supra in conjunction with FIG. 2, attention is next focused on a representative pair of successive frames in a level of FIG. 2 (e.g., frames L1 and L2 in level 4). The representative two frames of this pair of successive frames are denoted as frames A and B, wherein forward estimation is performed from frame A to frame B, so that frame A is earlier in time than frame B. Newly uncovered pixels in frame B have no corresponding pixels in frame A. Similarly, occluded pixels in frame A have no corresponding pixel in frame B. The present invention utilizes I-BLOCKs to deal locally with poorly matched motion blocks resulting from the newly uncovered pixels in frame B. For I-BLOCKs identified in accordance with the present invention as described infra, MC temporal filtering is omitted and spatial interpolation is used instead to determine pixel values in the I-BLOCK. The resulting spatial interpolation error block for the I-BLOCK (also called the residual error block of the interpolated I-BLOCK) is subsequently overlayed on (i.e., inserted into) the corresponding block within the associated MCTF temporal high frame.

The present invention discloses a method of compressing video that involves a spatiotemporal or space-time transformation utilizing motion compensated blocks in pairs of input frames, such as the representative pair having input frames A and B. These blocks are of various sizes and are chosen to match the local motion vector field, so there are small blocks where the field has a high spatial gradient and large blocks in more flat regions where the spatial gradient is small. This block based motion field is used to control the spatiotemporal transformation so that it filters along approximate motion trajectories. The output of such a transformation is compressed for transmission or storage.

Some of the blocks may be unconnected with neighbors in the next frame (timewise) because of covering or uncovering of regions in the frame due to motion, e.g. a ball moving in front of a background object that is stationary. Such regions (i.e., I-BLOCKs) should not take part in the MC temporal filtering, since the MC temporal filtering would lead to artifacts in the low frame rate video. These I-BLOCKs need to be compressed along with the other blocks (i.e., P-BLOCKs) in the temporal high frame. The P-BLOCKs can be used to spatially predict the unconnected I-BLOCKs via spatial interpolation. These I-BLOCKs are thus suited to work with non-hybrid MCTF.

Figure 3:
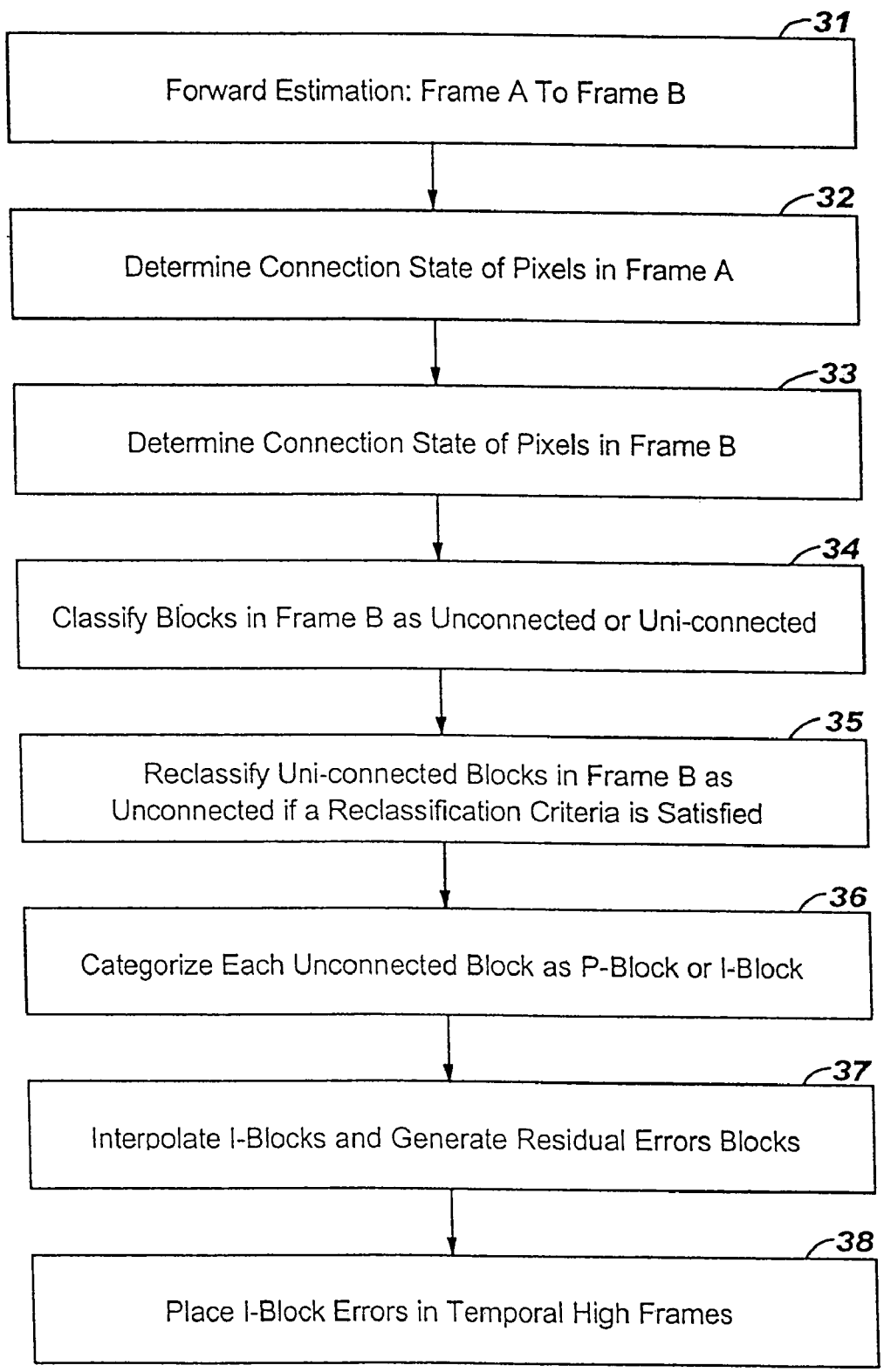
FIG. 3 is a flow chart depicting utilizing I-BLOCKs in temporal high frames generated by the MCTF process of FIG. 2, in accordance with embodiments of the present invention.

FIG. 3 is a flow chart depicting steps 31-38 for utilizing I-BLOCKs in the MCTF temporal high frames, in accordance with embodiments of the present invention.

Step 31 utilizes two successive frames, A and B, in a MCTF filtering level, wherein forward estimation is performed from frame A to frame B. As an example, frames A and B could represent frames F1 and F2 in level 5 of FIG. 2, or frames L1 and L2 in level 4 of FIG. 2.

Figure 4:
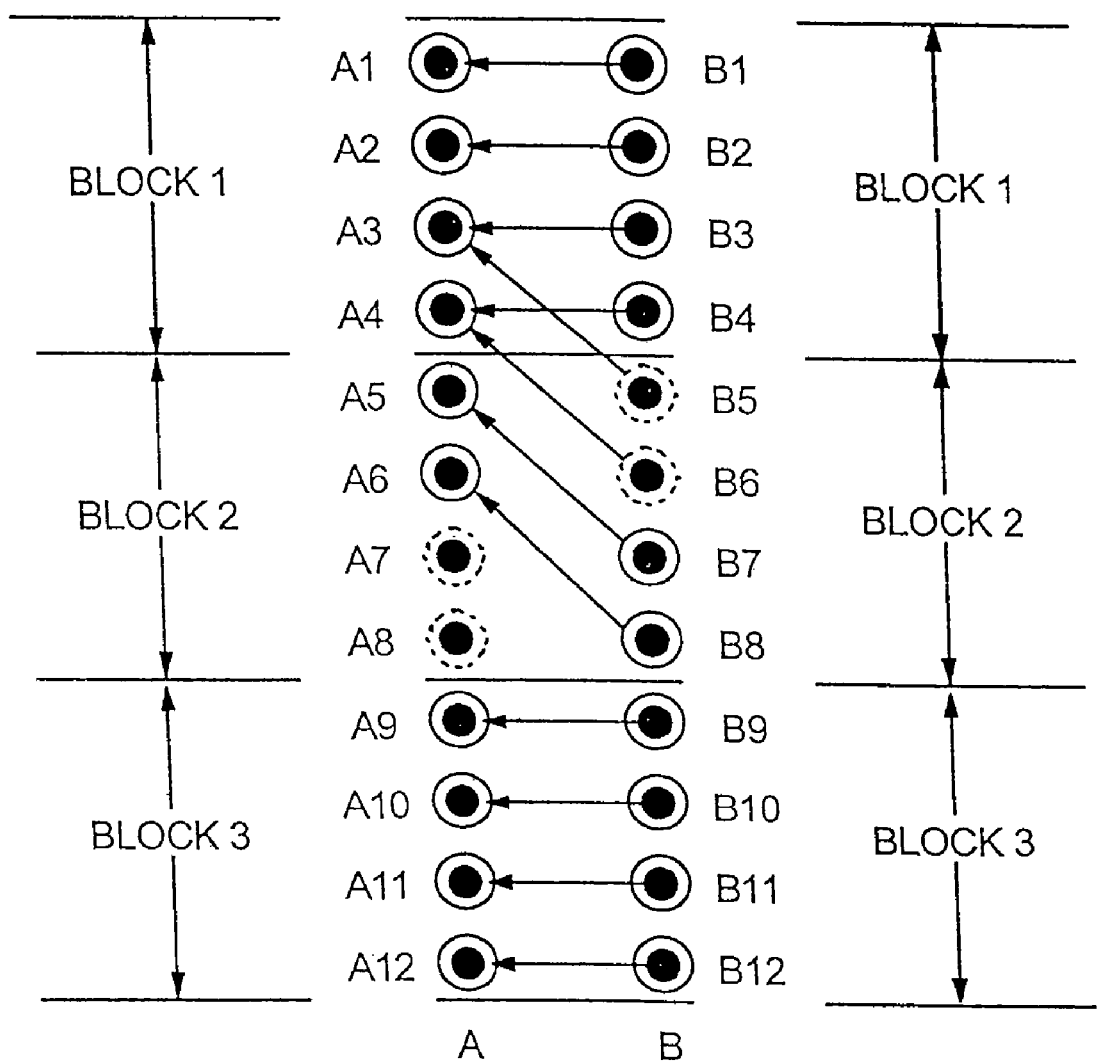
FIG. 4 depicts connections between pixels of successive frames, in accordance with embodiments of the present invention.

Steps 32 and 33 determine the connection state of pixels in frames A and B, respectively, as illustrated in FIG. 4 in accordance with embodiments of the present invention. Each pixel in frames A and B will be classified as having a connection state of "connected" or "unconnected" as follows. FIG. 4 shows pixels A1, A2, ..., A12 in frame A and Pixels B1, B2, ..., B12 in frame B. Pixels A1, A2, A3, and A4 are in block 1 of frame A. Pixels A5, A6, A7, and A8 are in block 2 of frame A. Pixels A9, A10, A11, and A12 are in block 3 of frame A. Pixels B1, B2, B3, and B4 are in block 1 of frame B. Pixels B5, B6, B7, and B8 are in block 2 of frame B. Pixels B9, B10, B11, and B12 are in block 3 of frame B. Pixels in frame A are used as references for pixels in frame B in relation to the forward motion estimation from frame A to frame B. Note that the blocks in frames A and B are 4×4 pixel blocks, and FIG. 4 shows only one column of each 4-column block. In FIG. 4, a pixel $P_A$ in frame A that is pointed to by an arrow from a pixel $P_B$ in frame B is being used as a reference for pixel $P_B$. For example, pixel A1 in frame A is being used as a reference for pixel B1 in frame B.

In step 32, a pixel in frame A is labeled as unconnected if not used as a reference by any pixel in frame B. Accordingly, pixels A7 and A8 are unconnected. A pixel in frame A is connected if used as a reference for a pixel in frame B. Accordingly, pixels A1-A6 and A9-A12 are connected. Pixels A3 and A4 require special treatment, however, since pixels A3 and A4 are each being used as a reference by more than one pixel in frame B. For example, pixel A3 is being used as a reference by pixels B3 and B5 of frame B, and the present invention uses an algorithm based on minimum mean-squared displaced frame difference (DFD) (to be defined infra) calculations to retain pixel A1 as a reference for pixel B3 or for pixel B5 but not for both pixels B3 and B5. Noting that pixel A3 is within block 1 of frame A and that pixel B3 is within block 1 of frame B, the algorithm calculates DFD11 which is the mean-squared DFD between block 1 of frame A and block 1 of frame B. Noting that pixel A3 is within block 1 of frame A and that pixel B5 is within block 2 of frame B, the algorithm calculates DFD12 which is the mean-squared DFD between block 1 of frame A and block 2 of frame B. If DFD11 is less than DFD12 then pixel A3 is retained as a reference for pixel B3 and pixel A3 is dropped as a reference for pixel B5. If DFD12 is less than DFD11 then pixel A3 is retained as a reference for pixel B5 and is dropped a reference for pixel B3. If DFD 11 is equal to DFD 12 then any tie-breaker may be used. A first example of a tie-breaker is "scan order" which means that pixel A3 is retained as a reference for whichever of pixels B3 and B5 is first determined to use pixel A3 as a reference. A second example of a tie-breaker is to pick a random number R from a uniform distribution between 0 and 1, and to retain pixel A3: as a reference for pixel B3 if R is less than 0.5; or as a reference for pixel B5 if R is not less than 0.5. In the example of FIG. 4, DFD11 is less than DFD12 so that pixel A3 is retained as a reference for pixel B3 and dropped as a reference for pixel B5. Similarly, pixels B4 and B6 each use pixel A4 as a reference and the previously-described DFD-based algorithm may be used to retain pixel A4 as a reference for either pixel B4 or pixel B6 but not for both pixels B4 and B6. In the example of FIG. 4, pixel A4 is retained as a reference for pixel B4 and dropped as a reference for pixel B6 based on the previously-described DFD-based algorithm.

In step 33, a pixel in frame B is labeled as unconnected if not using a reference pixel in frame A after the DFD-based algorithm has been applied to resolve those cases in which a pixel in frame A is used as a reference by more than one pixel in frame B. For example, pixels A3 and A4 were dropped as a reference for pixels B5 and B6, respectively, after application of the DFD-based algorithm, as explained supra. Accordingly, pixels B5 and B6 are unconnected. Otherwise pixels in frame B are connected. Accordingly, pixels B1-B4 and B7-B12 are connected. Note that if the previously-described DFD-based algorithm has been executed (i.e., when the connection states of the pixels in frame A were determined) then the arrow pointing from pixel B5 to pixel A3 and the arrow pointing from pixel B6 to pixel A4 in FIG. 4 are irrelevant since pixels A3 and A4 have already been dropped as a reference for pixels B5 and B6, respectively. While FIG. 4 shows step 33 being executed after step 32, step 33 may alternatively be executed before step 32. The previously-described DFD-based algorithm for resolving cases in which a pixel in frame A is used as a reference for more than one pixel in frame B may be executed at any time before, during, or after execution of steps 32 and 33. For example if step 32 is executed prior to step 33, then the previously-described DFD-based algorithm may be executed before step 32, between steps 32 and 33, or after step 33. As another example, if step 33 is executed prior to step 32, then the previously-described DFD-based algorithm may be executed before step 33, between steps 33 and 32, or after step 32.

What is actually needed as a result of executing steps 32 and 33 is the connection state (i.e., connected or unconnected) of each pixel in frame B relative to the pixels of frame A. Thus, step 32 may alternatively be omitted, since the connection state of each pixel in frame B requires knowledge of the reference pixels in frame A for each pixel in frame B but does not require knowledge of the connection state of each pixel in frame A.

The mean-squared DFD between a block in frame A and a block in frame B is defined as follows. Let n denote the number of pixels in each of said blocks. Let $V_{A1}, V_{A2}, \ldots V_{An}$ denote the values (e.g., luminance or chrominance) of the pixels in the block in frame A. Let $V_{B1}, V_{B2}, \ldots, V_{Bn}$ denote the values of the corresponding pixels in the block in frame B. The mean-squared DFD between the block in frame A and the block in frame B is:

Mean-squared $DFD=[(V_{A1}-V_{B1})^2+(V_{A2}-V_{B2})^2+ \ldots +(V_{An}-V_{Bn})^2]/n$ (1)

The previously-described DFD-based algorithm is applicable to motion vectors with sub-pixel accuracy in relation to connections between subpixels, as utilized in high performance video coders. A subpixel is location between adjacent pixels. The interpolated subpixel is used to calculate the DFD. Thus, no other changes in the MCTF algorithm are necessary but the use of a prescribed form of spatial interpolation when the reference pixel is not an integer. As an example, a separable 9-tap FIR interpolation filter may be utilized for this purpose.

After steps 32 and 33 of FIG. 4 have been executed, all pixels in frames A and B have been classified as being "unconnected" or "connected". Since the previously-described DFD-based algorithm eliminates multiple connections from two or more pixels in frame B to a reference pixel in frame A, each "connected" pixels in frame A is connected to exactly one pixel in frame B and vice versa.

Step 34 classifies the blocks in frame B as being "uni-connected" or "unconnected", in accordance with embodiments of the present invention. If at least a fraction F of the pixels in a block of a frame are unconnected, then the block is an "unconnected" block; otherwise the block is a "uni-connected" block. The fraction F has a value reflective of a tradeoff between image quality and processing time, since I-BLOCKs require extra processing time. The fraction F may have a value, inter alia, of at least 0.50 (e.g., in a range of 0.50 to 0.60, 0.50 to 0.75, 0.60 to 0.80, 0.50 to 1.00, 0.30 to 1.00, 0.50 to less than 1.00, etc.). By examining the reference pixels in frame A to which pixels in a uni-connected block in frame B are connected, a matched block in frame A (called a uni-connected block of frame A) may be determined for each uni-connected block in frame B. The resultant uni-connected blocks in frames A and B form a set of matched pairs of uni-connected blocks, wherein each matched pair consists of a uni-connected block in frame B and a matched uni-connected block in frame A. Let the matched pair of uni-connected blocks be denoted as first and second uni-connected blocks in frame A and frame B, respectively.

Step 35 reclassifies the first and second uni-connected blocks of the matched pair of uni-connected blocks as being unconnected if the following reclassification criteria is satisfied, in accordance with embodiments of the present invention. Let $V_1$ and $V_2$ denote the pixel variance of the first and second uni-connected blocks, respectively. The pixel variance of a block is the mean-squared deviation between the pixel values in the block and the mean pixel value for the block. Let $V_{MIN}$ denote the minimum of $V_1$ and $V_2$. Then the first and second uni-connected blocks are reclassified as being unconnected blocks if the mean-squared DFD between the first and second blocks exceeds $fV_{MIN}$, wherein f is a real number in a range of 0 to 1. For example, f may be in a range of, inter alia, 0.4 to 0.6, 0.5 to 0.7, 0.4 to 0.75, 0.5 to 0.9, 0.4 to 1.00, etc. After step 35 is executed, the classification of each block in frame B as "unconnected" or uni-connected" is complete.

Step 36 categorizes each unconnected block in frame B as a P-BLOCK or an I-BLOCK, in accordance with embodiments of the present invention. An I-BLOCK will subsequently have its initial pixel values replaced by spatially interpolated values derived from neighboring pixels outside of the I-BLOCK, as will be described infra. The difference between an initial pixel value and a spatially interpolated pixel value of an I-BLOCK pixel is the residual error of the interpolated I-BLOCK pixel. The block of residual errors at all pixels in the I-BLOCK is called a residual error block of, or associated with, the I-block.

To determine whether an unconnected block is an I-BLOCK or a P-BLOCK, the interpolated I-BLOCK is formed, its residual error block is computed, and the absolute value of the sum of the residual errors ($S_{RES}$) in the residual error block is also computed. $S_{RES}$ is called the "residual interpolation error" of the unconnected block. The residual errors are the errors at the pixels of the residual error block. In addition, forward and backward motion is performed on the unconnected block. The sum of the absolute DFDs of the forward and backward motion compensated prediction errors are computed. The minimum of the sum of the absolute DFDs for the forward and backward motion compensated prediction errors ($S_{MC-MIN}$) is determined. $S_{MC-MIN}$ is called the "minimum motion compensated error" of the unconnected block. The unconnected block is classified as an I-BLOCK if $S_{RES}$ is less than $S_{MC-MIN}$. The unconnected block is classified as a P-BLOCK if $S_{RES}$ is not less than $S_{MC-MIN}$.

Figures 7A, 7B, 7C:
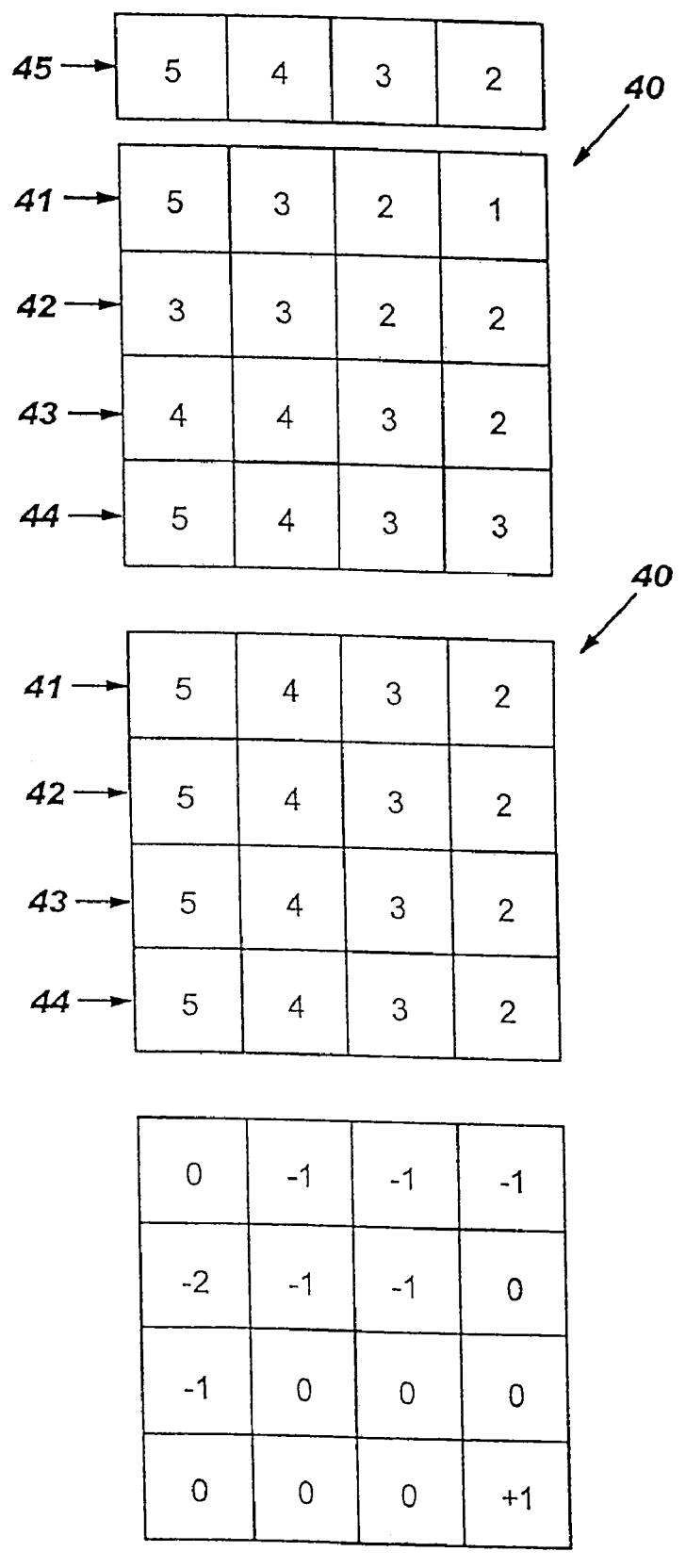
Figure 8:
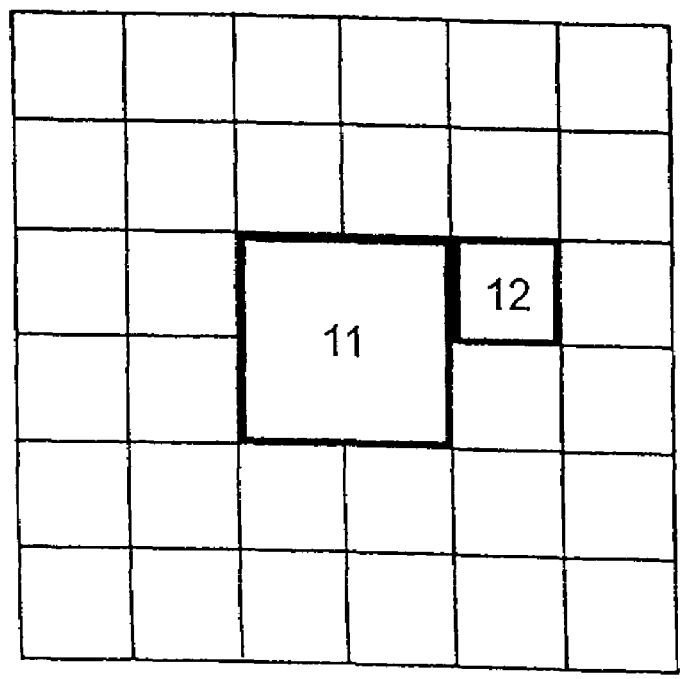
FIG. 8 illustrates a variable block size of I-BLOCKs in a frame, in accordance with embodiments of the present invention.

In step 37, the I-BLOCKs determined in step 36 are processed by spatial interpolation from available neighboring pixels and the residual error block associated with the interpolated I-BLOCK is generated, in accordance with embodiments of the present invention. The blocks in a frame may have a fixed size or a variable size. FIGS. 5-7 and 9 describe infra interpolation embodiments for the fixed block size case in accordance with embodiments of the present invention, and FIG. 8 is used to describe infra the variable block size case in accordance with embodiments of the present invention.

In step 38, the residual error block associated with the interpolated I-BLOCK is overlayed on (i.e., placed within) the pertinent temporal high frame associated with the frame pair A and B being analyzed, for subsequent compression of the pertinent temporal high frame by the EZBC 54 after execution of the Spatial Analysis 53 of FIG. 2. FIG. 7C (described infra) shows that the residual error block contains numerous near zero values and is thus suitable for being efficiently compressed.

Figures 5, 6:
FIG. 5 depicts a frame comprising I-BLOCKs and P-BLOCKs, in accordance with embodiments of the present invention.
FIG. 6 illustrates notation used for spatial interpolation of an I-BLOCK, in accordance with embodiments of the present invention.

FIG. 5 shows a frame comprising I-BLOCKs, P-BLOCKs, and uni-connected blocks. The I-BLOCKs comprise blocks 1-3, and the P-BLOCKs and uni-connected blocks comprise the remaining blocks which include blocks 4-10. Each I-BLOCK has four possible neighbors: an upper neighbor, a lower neighbor, a left neighbor, and a right neighbor. In the interpolation algorithms used herein, the blocks of a frame are processed in accordance with a scan order and only "available" blocks (i.e., previously processed I-BLOCKs having established pixel values therein, P-BLOCKs having original data therein, and/or uni-connected blocks) can be used for the spatial interpolation. For example, using a scan order of left-to-right and then top-to-bottom in FIG. 5 for block 1, only neighboring blocks 4-5 can be used for the block 1 spatial interpolations, since both block 2 and block 3 are not available. For block 2, however, there are four neighboring blocks available for the block 2 spatial interpolations after block 1 is interpolated, namely blocks 1 and 6-8. Similarly, there are four neighboring blocks available for the block 3 spatial interpolation after block 1 is interpolated, namely blocks 1 and 8-10.

The spatial interpolation is performed following a raster scanning rule such as the aforementioned left-to-right and then top-to-bottom scanning rule. Based on the number of available neighbors and their positions, there are different interpolation functions. FIG. 6 illustrates the following notation: "u" represents the upper neighboring pixels, "lw" represents the lower neighboring pixels, "lf" represent the left neighboring pixels, "r" represents the right neighboring pixels, and "in" represents the interpolated pixel values in the I-BLOCK. The interpolation may be linear or non-linear and many different interpolation schemes may be used.

FIGS. 7A-7C (collectively, "FIG. 7") illustrate a case in which only one neighbor block is available. The 4×4 pixel I-BLOCK 40 in FIG. 7A is defined by row segments 41-44, and it is assumed that the only available neighbors are in row segment 45 in a neighboring upper block above block 40. The example pixel values shown for I-BLOCK 40 in FIG. 7A are the initial values prior to the spatial interpolation. The pixel values in row segment 45 are used for spatial interpolation. For this case, the C-code in Table 1 may be used to effectuate the spatial interpolation.

TABLE 1

```
for (i=0; i<4; i++)
    for (j=0; j<4; j++)
        in[i*4+j] = u[j];
```

FIG. 7B shows the resultant interpolated values in the I-BLOCK 40 resulting from execution of the C-code of Table 1. FIG. 7C shows the residual error block determined by subtracting the interpolated pixel values of FIG. 7B from the initial pixel values of FIG. 7A. The residual error block depicted FIG. 7C is overlayed within (i.e., placed within) the pertinent temporal high frame associated with the frame pair A and B being analyzed, for subsequent compression of the pertinent temporal high frame by the EZBC 54 of FIG. 2. While FIGS. 7A-7C described the embodiment in which only upper neighboring pixels are available for interpolation, the cases in which only left, right, or lower neighboring pixels are available for interpolation may be derived analogously from the "upper" neighboring case described supra, or by a proper coordinate rotation.

Tables 2 and 3 illustrate interpolation algorithms in which two neighboring blocks are available. Table 2 specifies formulas for calculating the interpolated pixel values in[1] . . . in[15] (see FIG. 6) in the 4×4 I-BLOCK using available neighboring pixels in the upper and left positions in accordance with the notation of FIG. 6. Table 3 specifies C-code for calculating the interpolated pixel values in[0] . . . in[15] in the 4×4 I-BLOCK using neighboring pixels in the upper and lower positions in accordance with the notation of FIG. 6.

TABLE 2

| | | | |
|---|---|---|---|
| in[0]=(lf[0]+u[0])/2; | in[1]=u[1]; | in[2]=u[2]; | in[3]=u[3]; |
| in[4]=lf[1]; | in[5]=(in[4]+in[1])/2; | in[6]=in[2]; | in[7]=in[3]; |
| in[8]=lf[2]; | in[9]=in[8]; | in[10]=(in[9]+in[6])/2; | in[11]=in[7]; |
| in[12]=lf[3]; | in[13]=in[12]; | in[14]=in[13]; | in[15]=(in[11]+in[14])/2 |

TABLE 3

```
or (i=0; i<4; i++)
{
    in[i]=u[i];
    in[12+i]=lw[i];
    in[4+i] = in[8+i] = (u[i]+lw[i])/2;
}
```

Other embodiments in which two neighboring blocks are available may be derived analogously from the "upper and left" or "upper and lower" neighboring cases described supra in conjunction with Tables 2 and 3, respectively, or by a proper coordinate rotation.

Table 4 illustrates interpolation algorithms in which three neighboring blocks are available. Table 4 specifies C-code for calculating the interpolated pixel values in[0] . . . in[15] (see FIG. 6) in the 4×4 I-BLOCK using neighboring pixels in the upper, left, and right positions in accordance with the notation of FIG. 6.

TABLE 4

| in[0]=(lf[0]+u[0])/2; | in[1]=u[1]; | in[2]=u[2]; | in[3]=(u[3]+r[0])/2; |
|---|---|---|---|
| in[4]=lf[1]; | in[5]=(in[4]+in[1])/2; | in[7]=r[1]; | in[6]=(in[2]+in[7])/2; |
| in[8]=lf[2]; | in[9]=in[8]; | in[11]=r[2]; | in[10]=in[11]; |
| in[12]=lf[3]; | in[13]=in[12]; | in[15]=r[3]; | in[14]=in[15]; |

Other embodiments in which three neighboring blocks are available may be derived analogously from the "upper, left, and right" neighboring case described supra in conjunction with Table 4, or by a proper coordinate rotation.

Table 5 illustrates interpolation algorithms in which four neighboring blocks are available. Table 5 specifies C-code for calculating the interpolated pixel values in[0] . . . in[15] (see FIG. 6) in the 4×4 I-BLOCK using neighboring pixels in the upper, lower, left, and right positions in accordance with the notation of FIG. 6.

TABLE 5

| in[0]=(lf[0]+u[0])/2; | in[1]=u[1]; | in[2]=u[2]; | in[3]=(u[3]+r[0])/2; |
|---|---|---|---|
| in[4]=lf[1]; | in[5]=(in[4]+in[1])/2; | in[7]=r[1]; | in[6]=(in[2]+in[7])/2; |
| in[12]=(lf[3]+lw[0])/2; | in[13]=lw[1]; | in[14]=lw[2]; | in[15]=(lw[3]+r[3])/2; |
| in[8]=lf[2]; | in[9]=(in[8]+in[13])/2; | in[11]=r[2]; | in[10]=(in[14]+in[11])/2 |

FIG. 8 illustrates the variable block size case, which arises from 5-level hierarchical variable size block matching where block sizes range from 4×4 to 64×64. For example in FIG. 8, I-BLOCKs 11 and 12 are shown. Block 11 has a pixel size of 8×8 and block 12 has a pixel size of 4×4. If I-BLOCKs 11 and 12 are processed in the previously mentioned left-to-right and then top-to-bottom scanning order (i.e., block 11 is interpolated before block 12 is interpolated) then block 12 will not be available for block 11's interpolation. To simplify the interpolation, block 11 may be treated as 4 separate 4×4 I-BLOCKs for interpolation purposes, so that the spatial interpolation may be implemented as fixed-block interpolation.

FIGS. 9A-9F (collectively, "FIG. 9") illustrate a directional spatial interpolation scheme for determining pixel values for I-BLOCKs, in accordance with embodiments of the present invention. FIGS. 9A-9F depict a 4×4 I-BLOCK 61 within a portion of a frame 60. The portion of the frame 60 contains pixels P11 . . . P99. I-BLOCK 61 contains pixels P22, P23, P24, P25, P32, P33, P34, P35, P42, P43, P44, P45, P52, P53, P54, and P55. In FIGS. 9A-9F, all pixels not in I-BLOCK 61 are neighbors of the pixels in I-BLOCK 61. The interpolation for the pixels in I-BLOCK 61 are along parallel lines making a fixed angle θ with the X axis as illustrated by one of the parallel lines, namely line 66, shown in FIG. 9A. Each Figure of FIGS. 9B-9F represents an embodiment with a different value of θ. For the purpose of estimating values of θ for illustrative purposes, it is assumed for simplicity that each pixel is a square. Thus, θ=45 degrees for the line 66 in FIG. 9A which passes through diagonally opposite vertices of pixels P25, P34, P43, and P52. Of course, θ will differ from 45 degrees for line 62 in FIG. 9A if the pixels have a rectangular, non-square shape. Note that θ and θ+180 degrees represent the same set of parallel lines. The interpolations along each such line utilizes pixel values of the nearest available neighbors on the line, wherein an available neighbor is a neighbor whose pixel value has been previously established. The directional interpolation scheme assumes that at least one neighbor is always available for each such line of the parallel lines.

FIG. 9B illustrates a directional interpolation such that θ=45 degrees with respect to parallel lines 63, 64, . . . , 69. Lines 63, 64, . . . , 69 are called "directional lines." Since line 63 passes though pixel P22, line 63 is used to determine the value of pixel P22 based on interpolation using: neighbors P13 and P31 if both P13 and P31 are available; only neighbor P13 if P13 is available and P31 is not available; or only neighbor P31 if P31 is available and P13 is not available. Since line 64 passes though pixels P23 and P32, line 64 is used to determine the value of pixels P23 and P32 based on interpolation using: neighbors P14 and P41 if both P14 and P41 are available; only neighbor P14 if P14 is available and P41 is not available; or only neighbor P31 if P31 is available and P13 is not available. Similarly, interpolations along lines 65, 66, 67, 68, and 69 are used to determine pixel values at (P24, P33, P42), (P25, P34, P43, P52), (P35, P44, P53), (P45, P54), and (P55), respectively.

Lines 67-69 present alternative possibilities for nearest neighbors. For example, line 68 has neighbors (P36, P27, and P18) and (P63, P72, and P81) at opposite borders of the I-BLOCK 61. In choosing which neighbor of the neighbors (P36, P27, and P18) to use, the directional interpolation will use pixel P36 if available since pixel P36 is the nearest neighbor of the neighbors (P36, P27, and P18). If pixel P36 is unavailable then the directional interpolation will use pixel P27 if available since pixel P27 is the nearest neighbor of the neighbors (P27 and P18). If pixel P27 is unavailable then the directional interpolation will use the remaining neighbor pixel P18 if available. If pixel P27 is unavailable then the directional interpolation will not use any of pixels (P36, P27, and P18). Similarly, the directional interpolation will choose one pixel of neighbor pixels (P63, P72, and P81) based on the nearest available neighbor criteria for making this choice. Therefore, as a result of the applying the nearest available neighbor criteria, the directional interpolation along line 68 for determining the values of pixels P45 and P54 will utilize one of the following neighbor combinations: P63 alone, P72 alone, P81 alone, P63 and P36, P63 and P27, P63 and P18, P72 and P36, P72 and P27, P72 and P18, P81 and P36, P81 and P27, P81 and P18, P36 alone, P27 alone, and P18 alone.

The directional interpolation for linear interpolation along line 68 is next illustrated for determining pixel values for pixels P45 and P54, assuming that neighbor pixels P36 and P63 are both available. The points Q0, Q1, Q2, Q3, and Q4 along line 68 are as shown in FIG. 9B. Point Q0, Q1, Q2, Q3, and Q4 is at the midpoint of the portion of line 68 that respectively spans pixel P27, P36, P45, P54, and P63. Let D12, D13, and D14 respectively denote the distance between point Q1 and point Q2, Q3, and Q4. Let F1214 and F1314 respectively denote D12/D14 and D13/D14. Let V36 and V63 respectively denote the pixel value at pixel P36 and P63. Then the pixel value at pixel P45 and P54 is (1−F1214)*V36+F1214*V63 and (1−F1314)*V36+F1314*V63, respectively.

The directional interpolation for linear interpolation along line 68 raises the question of how to do the interpolation if neighbor pixel P36 in not available and neighbor pixel P27 is available. If V27 denotes the pixel value at pixel P27 then V27 will substitute for V36 wherever V36 appears in the interpolation formula. However, the scope of the present invention includes three options for treating the distances along line 68.

A first option is to retain the parameters F1214 and F1314 in the interpolation formulas, which is conceptually equivalent utilizing point Q1 as a reference for measuring distances even though pixel P36 has been replaced by pixel P27 as the nearest available neighbor. For the first option, the pixel value at pixel P45 and P54 is (1−F1214)*V27+F1214*V63 and (1−F1314)*V27+F1314*V63, respectively.

A second option is to utilize distances from point Q0 where line 68 begins at neighbor pixel P27. For the second option, D02, D03, and D04 respectively denote the distance between point Q0 and point Q2, Q3, and Q4. Let F0204 and F0304 respectively denote D02/D04 and D03/D04. Then the pixel value at pixel P45 and P54 is (1−F0204)*V27+F0204*V63 and (1−F0304)*V27+F0304*V63, respectively.

A third option is to use a compromise between the first and second options. Instead of using either (F1214 and F1314) or (F0204 and F0304) as in the first and second options, the parameters $(F1214,F0204)_{AVE}$ and $(F1314,F0304)_{AVE}$ are used, wherein $(F1214,F0204)_{AVE}$ is a weighted or unweighted average of F1214 and F0204, and $(F1314,F0304)_{AVE}$ is a weighted or unweighted average of F1314 and F0304. Then the pixel value at pixel P45 and P54 is $(1-(F1214,F0204)_{AVE})$*V27+$(F1214,F0204)_{AVE}$*V63 and $(F1314,F0304)_{AVE}$*V27+$(F1314,F0304)_{AVE}$*V63, respectively. If (F1214, F0204)$_{AVE}$) and $(F1314,F0304)_{AVE}$ are weighted averages, the weighting could be based on extrinsic factors such as an extrinsic knowledge of the relative importance of pixels P36 and P27 to the image quality of the I-BLOCK 61 along line 68, irrespective of the distances of pixels P36 and P27 from points Q2 and Q3 along line 68.

Figure 9C:

FIGS. 9C-9F are similar to FIG. 9B except for the value of θ. In FIG. 9C, θ=90 degrees for directional lines 71-74. Values at pixels P22, P32, P42, and P52 are determined from interpolation along line 71, using a subset of neighbor pixels P12, P62, P72, P82, and P92. Values at pixels P23, P33, P43, and P53 are determined from interpolation along line 72, using a subset of neighbor pixels P13, P63, P73, P83, and P93. Values at pixels P24, P34, P44, and P54 are determined from interpolation along line 73, using a subset of neighbor pixels P14, P64, P74, P84, and P94. Values at pixels P25, P35, P45, and P55 are determined from interpolation along line 74, using a subset of neighbor pixels P15, P65, P75, P85, and P95.

Figure 9D:
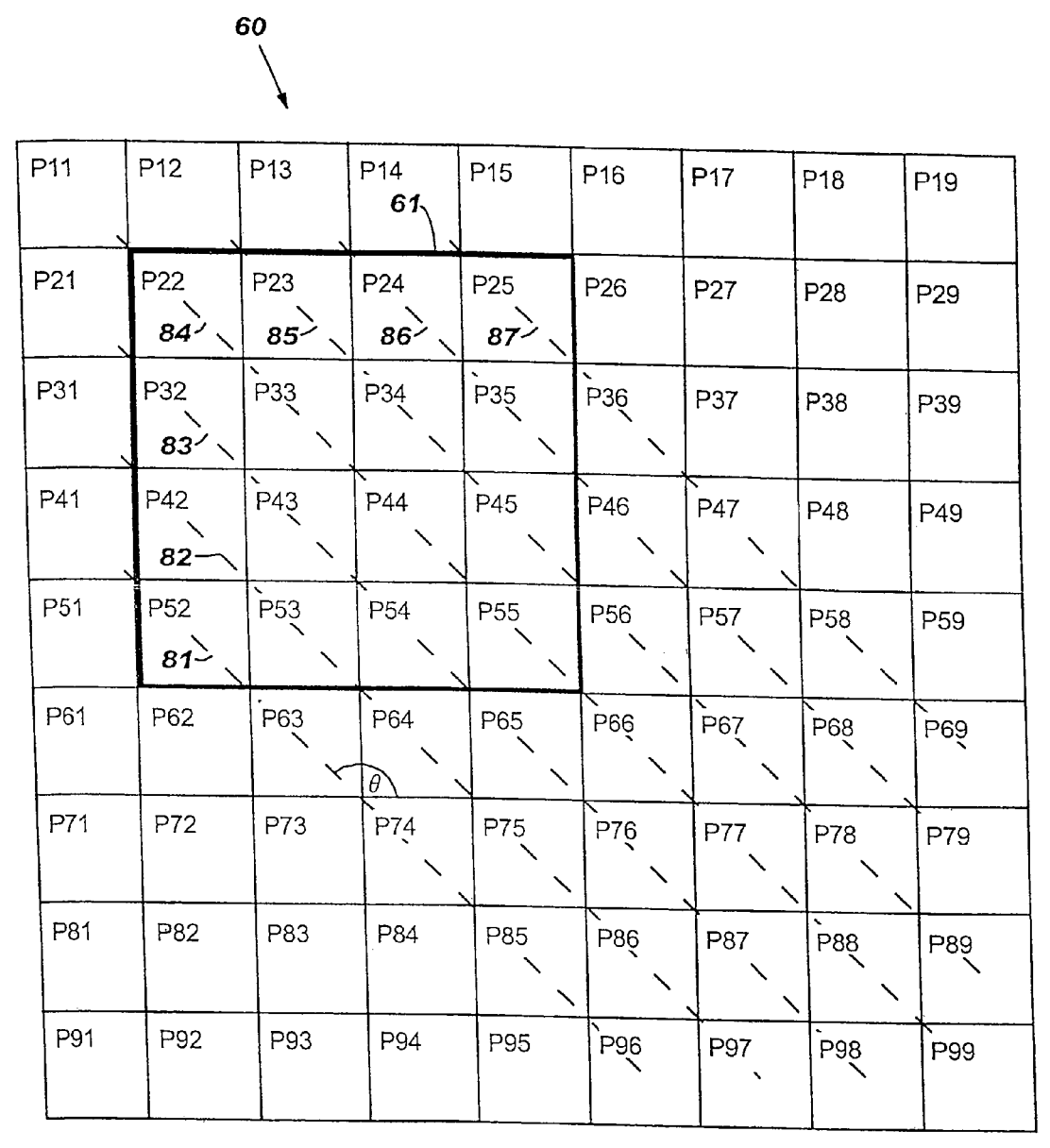

In FIG. 9D, θ=135 degrees for directional lines 81-87. The value at pixel P52 is determined from interpolation along line 81, using a subset of neighbor pixels P41, P63, P74, P85, and P96. Values at pixels P42 and P53 are determined from interpolation along line 82, using a subset of neighbor pixels P31, P64, P75, P86, and P97. Values at pixels P32, P43, and P54 are determined from interpolation along line 83, using a subset of neighbor pixels P21, P65, P76, P87, and P98. Values at pixels P22, P33, P44, and P55 are determined from interpolation along line 84, using a subset of neighbor pixels P11, P66, P77, P88, and P99. Values at pixels P23, P34, and P45 are determined from interpolation along line 85, using a subset of neighbor pixels P12, P56, P67, P78, and P89. Values at pixels P24 and P35 are determined from interpolation along line 86, using a subset of neighbor pixels P13, P46, P57, P68, and P79. The value at pixel P25 is determined from interpolation along line 87, using a subset of neighbor pixels P14, P36, P47, P58, and P69.

Figure 9E:
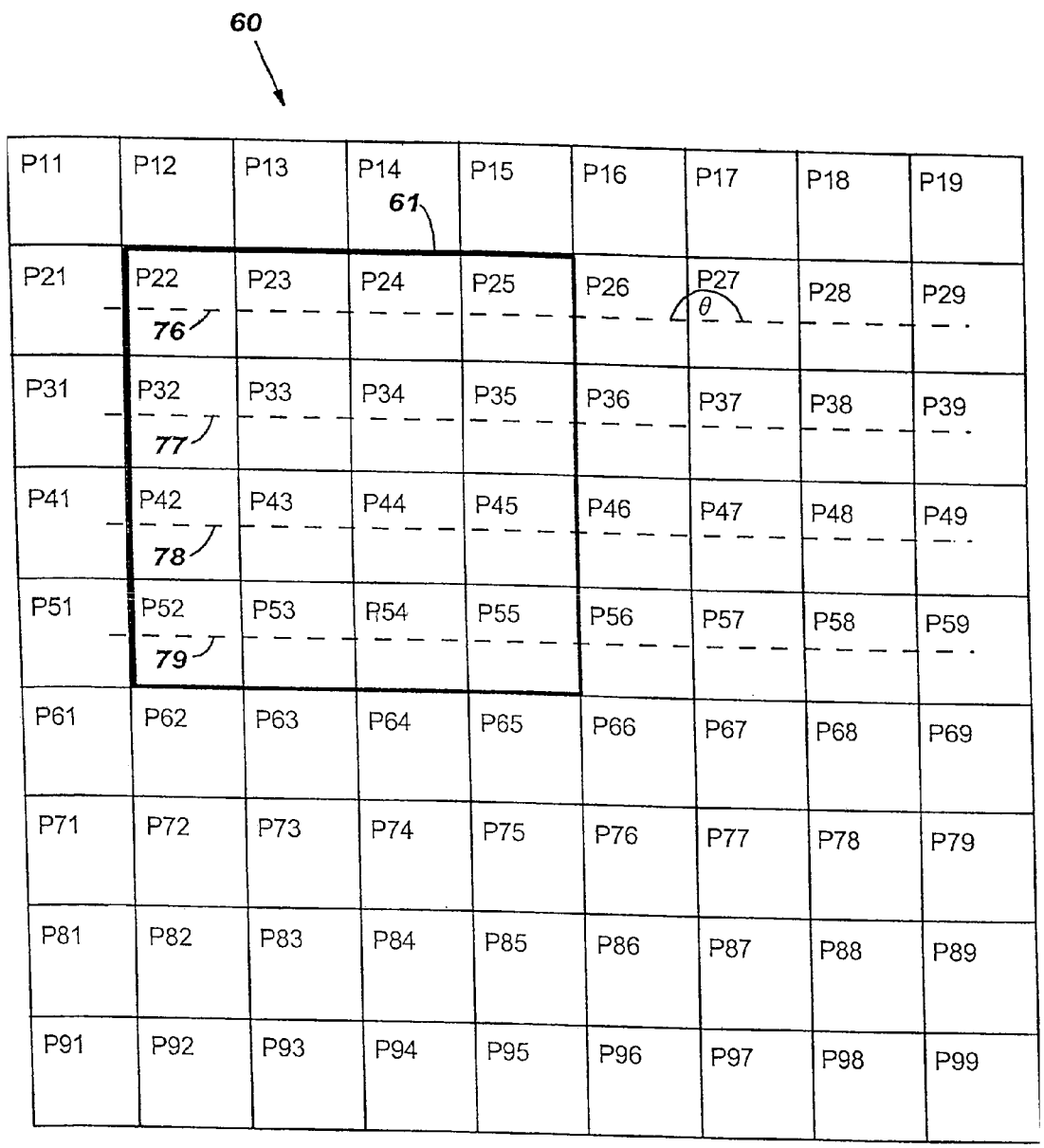

In FIG. 9E, θ=0 degrees (or 180 degrees) for directional lines 76-79. Values at pixels P22, P23, P24, and P25 are determined from interpolation along line 76, using a subset of neighbor pixels P21, P26, P27, P28, and P29. Values at pixels P32, P33, P34, and P35 are determined from interpolation along line 77, using a subset of neighbor pixels P31, P36, P37, P38, and P39. Values at pixels P42, P43, P44, and P45 are determined from interpolation along line 78, using a subset of neighbor pixels P41, P46, P47, P48, and P49. Values at pixels P52, P53, P54, and P55 are determined from interpolation along line 79, using a subset of neighbor pixels P51, P56, P57, P58, and P59.

Figure 9F:
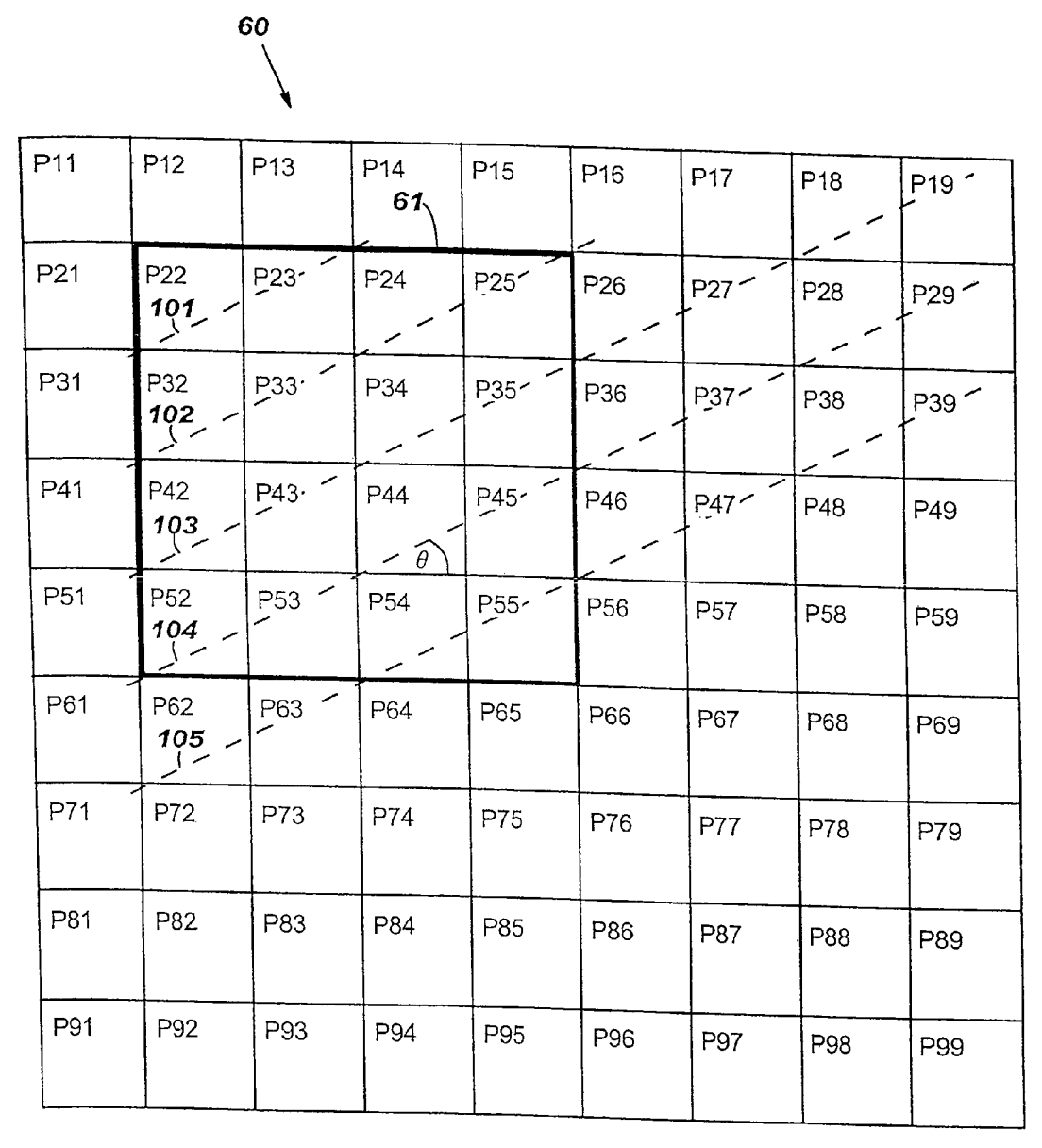

In FIG. 9F, θ=26.56 degrees (i.e., θ is the inverse tangent of 2/4) for directional lines 101-105. Values at pixels P22 and P23 are determined from interpolation along line 101, using a subset of neighbor pixels P31 and P14. Values at pixels P32, P33, P24, and P25 are determined from interpolation along line 102, using a subset of neighbor pixels P41 and P16. Values at pixels P42, P43, P34, and P35 are determined from interpolation along line 103, using a subset of neighbor pixels P51, P26, P27, P18, and P19. Values at pixels P52, P53, P44, and P45 are determined from interpolation along line 104, using a subset of neighbor pixels P61, P36, P37, P28, and P29. Values at pixels P54 and P55 are determined from interpolation along line 105, using a subset of neighbor pixels P71, P46, P47, P38, and P39.

FIGS. 9A-9F illustrate directional spatial interpolation characterized by all pixel values in the I-BLOCK being determined by spatial interpolation along parallel directional lines. In contrast, FIGS. 7A-7C and Tables 1-5 illustrate nondirectional spatial interpolation characterized by all pixel values in the I-BLOCK being determined by nearest available neighbor spatial interpolation in which no directional line passing through the I-BLOCK is utilized in the spatial interpolations. Another spatial interpolation method for an I-BLOCK is hybrid spatial interpolation which comprises a combination of directional spatial interpolation and nondirectional spatial interpolation. With hybrid spatial interpolation, at least one directional line is used for some spatial interpolations in the I-BLOCK, and some pixel values in the I-BLOCK are determined by nearest available neighbor spatial interpolation in which no directional line passing through the I-BLOCK is utilized. When directional spatial interpolation or hybrid spatial interpolation is used, the chosen direction and hybrid mask must be coded and transmitted as side information. An embodiment of the present invention uses a short fixed Huffman code for this purpose.

Figure 10:
FIG. 10 illustrates hybrid spatial interpolation of an I-BLOCK, in accordance with embodiments of the present invention.

FIG. 10 illustrates hybrid spatial interpolation, in accordance with embodiments of the present invention. FIG. 10 includes directional lines 121-124 which are used in the spatial interpolations for determining values at pixels P25, P34, P43, and P52 (along line 121), pixels P35, P44, and P53 (along line 122), pixels P45 and P54 (along line 123), and pixel P55 (along line 124). However, values at pixels P22, P23, P24, P32, P33, and P42 are determined by nondirectional spatial interpolation using nearest neighbor upper pixels P12, P13, P14 and nearest neighbor left pixels P21, P31, and P41.

As illustrated in the preceding spatial interpolation examples associated with FIGS. 6-10 and Tables 1-5, the values for the pixels of each I-BLOCK in a given frame are calculated by spatial interpolation based on values of nearest available neighbor pixels relative to each said I-BLOCK in the given frame. A given pixel outside of a specified I-BLOCK of the given frame is said to be a neighbor pixel relative to the I-BLOCK if said given pixel is sufficiently close to the I-BLOCK to potentially contribute to the value of a pixel in the I-BLOCK by said spatial interpolation.

The preceding discussion herein in conjunction with FIGS. 6-10 and Tables 1-5 for determining values of pixels in I-BLOCKs by interpolation focused on linear interpolation. Nonetheless, the scope of the present invention includes nonlinear interpolation as well in accordance with any nonlinear interpolation scheme that exploits the relative importance of the various neighboring pixels which contribute to the value of the pixels in the I-BLOCK.

OBMC Processing

The present invention discloses embodiments relating to a processing of video frames, wherein each frame processed is divided into M blocks that include at least two differently sized blocks, and wherein M is at least 9.

With traditional block motion compensation, the current frame being processed is divided into blocks of pixels, wherein each such block $B_{CUR0}$ of pixels in the current frame is predicted from a block $B_{REF0}$ of the same size in the reference frame. The block $B_{CUR0}$ of pixels in the current frame is called a "current block" or a "self block". The self block $B_{CUR0}$ in the current frame is spatially shifted from the block $B_{REF0}$ in the reference frame by a motion vector $V_0$. Thus a pixel value $I_{CUR0}(P_{CUR0})$ at a pixel location $P_0$ (identified by vector $P_{CUR0}$) in the self block $B_{CUR0}$ in the current frame is predicted to equal the pixel value $I_{REF0}(P_{CUR0}-V_0)$ at a pixel location identified by vector $(P_{CUR0}-V_0)$ in the block $B_{REF0}$ in the reference frame. The dependent variable "I" denotes a pixel value of luminance and/or chrominance. A disadvantage of traditional block motion compensation relates to discontinuities introduced at block borders (blocking artifacts). The discontinuities may have the form of sharp horizontal and vertical edges which may be highly visible to the human eye and may also produce ringing effects (i.e., big coefficients in high frequency sub-bands) in the Fourier-related transform used for transform coding of the residual frames.

With overlapped block motion compensation (OBMC), nearest neighboring blocks of the self block $B_{CUR}$ may be utilized for predicting the pixel values in the self block $B_{CUR}$. For example, the nearest neighboring blocks may consist of the four nearest neighboring blocks immediately to the right, bottom, left, and top of the self block $B_{CUR}$, respectively denoted as $B_1$, $B_2$, $B_3$, and $B_4$ which are spatially shifted from corresponding blocks $B_{REF1}$, $B_{REF2}$, $B_{REF3}$, and $B_{REF4}$ in the reference frame by the motion vectors $V_1$, $V_2$, $V_3$, and $V_4$, respectively. The blocks $B_{REF1}$, $B_{REF2}$, $B_{REF3}$, and $B_{REF4}$ in the reference frame are most likely not nearest neighbor blocks of the block $B_{REF0}$ in the reference frame. A weight $W(P_{CUR0})$ is associated with a pixel location $P_0$ (identified by vector $(P_{CUR0})$ in the self block $B_{CUR0}$. Weights $W(P_1)$, $W(P_2)$, $W(P_3)$, and $W(P_4)$ are associated with the pixel locations $P_1$, $P_2$, $P_3$, and $P_4$ in the nearest neighboring blocks $B_1$, $B_2$, $B_3$, and $B_4$, respectively, such that the pixel locations $P_1$, $P_2$, $P_3$, and $P_4$ correspond to the pixel location $P_0$. With OBMC, the pixel value $I_{CUR0}(P_{CUR0})$ at the pixel location $P_0$ is predicted to equal $W(P_{CUR0})*I_{REF0}(P_{CUR0}-V_0)+[W(P_1)*I(P_1-V_1)+W(P_2)*I(P_2-V_2)+W(P_3)*I(P_3-V_3)+W(P_4)*I(P_4-V_4)]$. Thus, the predicted pixel value at the pixel location identified by vector $P_{CUR0}$ in the self block $B_{CUR0}$ mitigates the discontinuities introduced at block borders by taking into account pixel value contributions from nearest neighbor blocks in their displaced locations in the reference frame. An array of weights that includes $W(P_{CUR0})$ for all pixels in the self block $B_{CUR0}$ constitutes a "weighting window" for the self block $B_{CUR0}$. Similarly, an array of weights that includes $W(P_1)$, $W(P_2)$, $W(P_3)$, and $W(P_4)$, for all pixels in the nearest neighboring blocks $B_1$, $B_2$, $B_3$, and $B_4$ constitutes a weighting window for the nearest neighboring blocks $B_1$, $B_2$, $B_3$, and $B_4$, respectively. Examples of weighting windows and their generation according to the present invention are presented in FIGS. 17, 18, 21, and 22, discussed infra.

The present invention discloses variable block size OBMC. The blocks in the current frame and its relationship to blocks in the reference frame are illustrated next in FIGS. 11 and 12.

Figure 11:
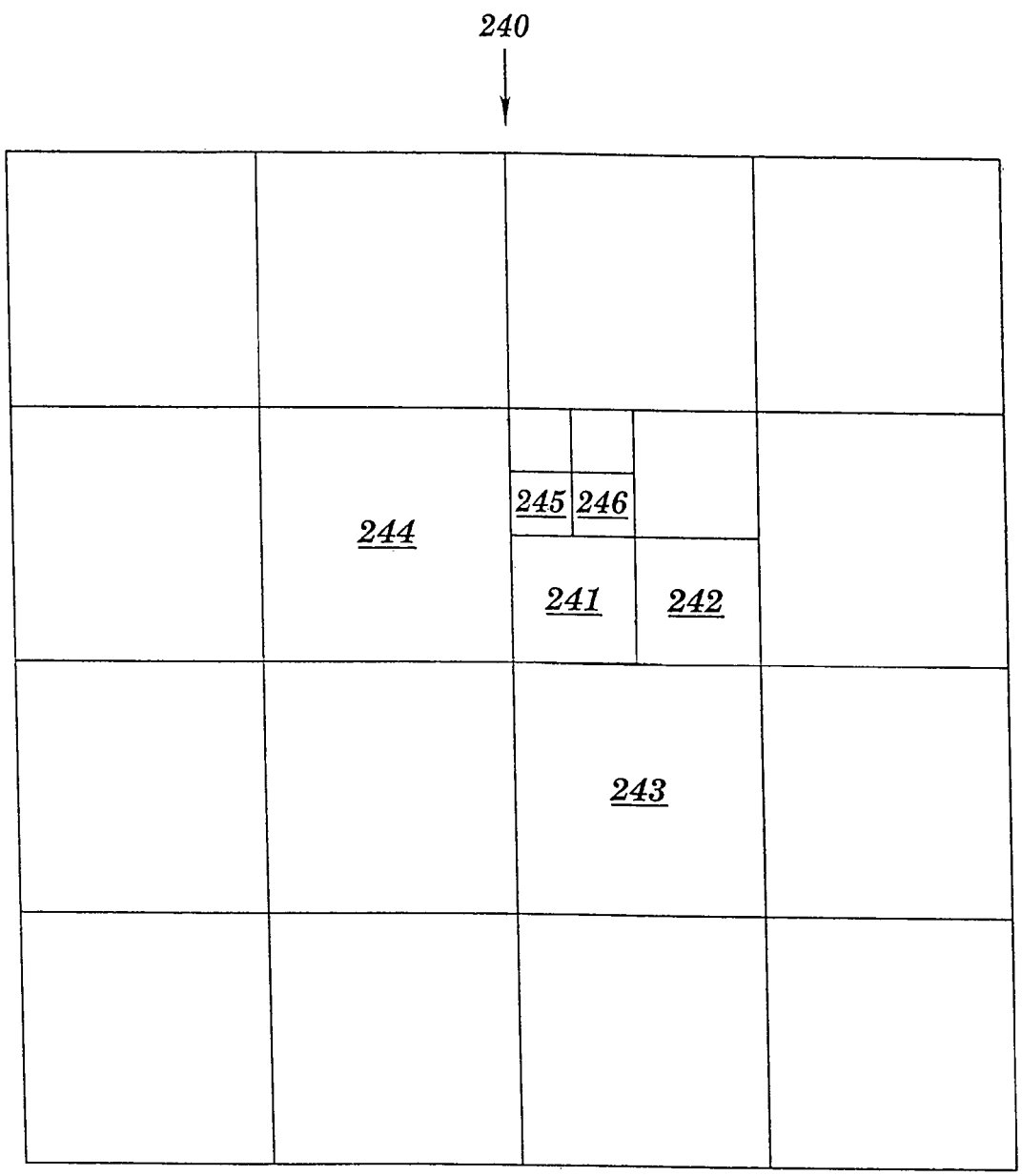
FIG. 11 depicts a current frame that has been configured into variable-size blocks, in accordance with embodiments of the present invention.

FIG. 11 depicts a current frame 240 that has been configured into variables size blocks (e.g., by a quad tree algorithm), in accordance with embodiments of the present invention. The current frame 240 comprises 22 blocks as shown. Each block of FIG. 11 is processed as a self block in consideration of its nearest neighbor blocks. For example, consider block 241 being processed as a self block. Self block 244 has nearest neighbor blocks 242-246. Note the self block may have a size that is equal to, larger than or smaller than the nearest neighbor block. In FIG. 11, the size of the self block 241 is: equal to the size of its nearest neighbor block 242, larger than the size of its nearest neighbor blocks 245 and 246, and smaller than the size of its nearest neighbor blocks 243 and 244.

Figure 12:
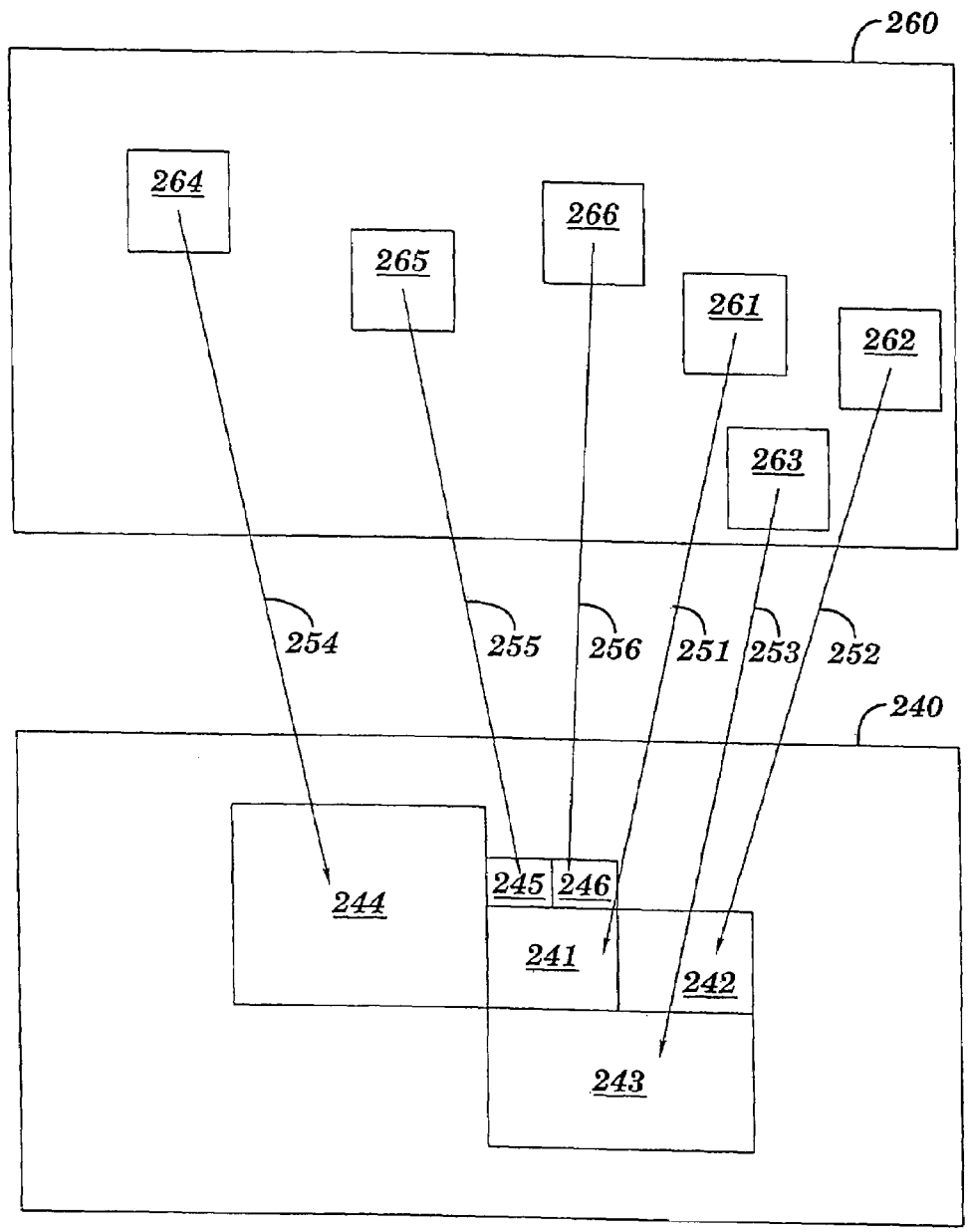
FIG. 12 depicts the current frame of FIG. 11 and its reference frame together with motion vectors that link blocks in the current frame with corresponding blocks in the reference frame, in accordance with embodiments of the present invention.

FIG. 12 depicts the current frame 240 of FIG. 11 and a reference frame 260 together with vectors 251-256 that respectively link blocks 241-246 in the current frame 240 with corresponding blocks 261-266 in the reference frame 260, in accordance with embodiments of the present invention. A normal projection of the vectors 251-256 onto the reference frame 260 are the motion vectors denoting a vector displacement of the blocks 241-246 from the blocks 261-266, respectively. Although the blocks 261-266 appear for simplicity as having the same size in the reference frame 260, the blocks 261-266 in reality have the same size as their corresponding blocks 241-246, respectively, in the current frame 240. The reference frame 260 represents one or more reference frames, each such reference frame having its own motion vectors and blocks associated with the blocks of the current frame, since each pixel in the current frame may be predicted from corresponding pixels in a single reference frame or in a plurality of reference frames.

The present invention discloses a method of compressing video that involves a spatiotemporal or space-time transformation utilizing motion compensated blocks in pairs of input frames, such as the representative pair having input frames A and B discussed supra in conjunction with FIG. 3. These blocks are of various sizes and are chosen to match the local motion vector field, so there are small blocks where the motion has a high spatial gradient and large blocks in more flat regions where the spatial gradient of the motion is small. Nevertheless as explained supra, the motion vectors of the different blocks are not continuous across the block edges. As a result artifacts can be created in the prediction of one frame from the other frame. OBMC of the present invention addresses this problem by making the prediction from a weighted combination of estimates using the current block's motion vector and the motion vectors of its nearest neighbor blocks. The OBMC of the present invention is further improved by iterative adjustments to the block motion vectors to arrive at improved motion vectors, which increase the accuracy of the resulting frame prediction and therefore increase coding efficiency. With the present invention, this iteration may be optionally omitted. The output of the MCTF obtained using the OBMC is then compressed for transmission or storage. Additionally, the motion vectors are sent to the receiver as overhead, and may constitute about 10-15% of the total bit rate.

Figure 13A:
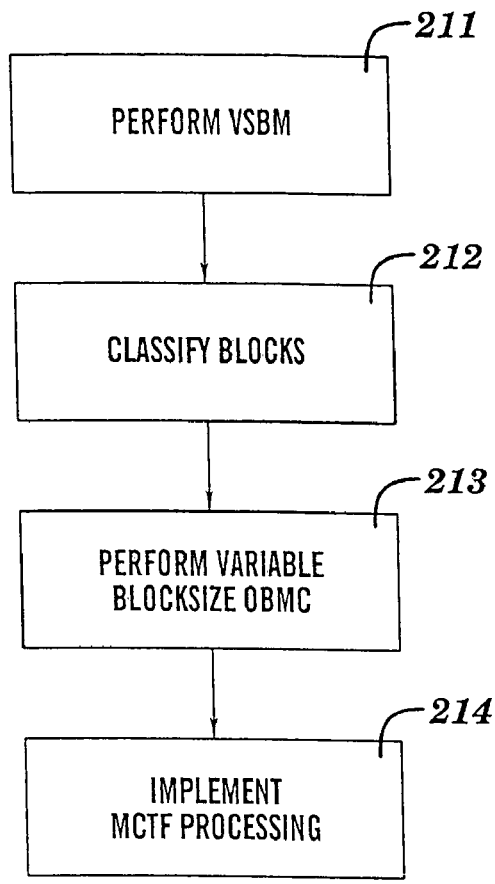
FIG. 13A is a flow chart for utilizing variable block-size OBMC in the MCTF temporal high frames of FIG. 2, in accordance with embodiments of the present invention.
Figure 15:
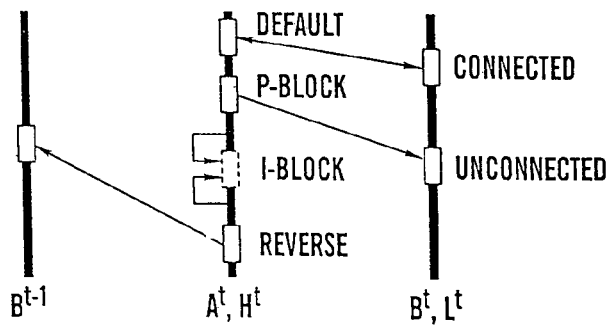
FIG. 15 depicts two successive input frames to be transformed by the MCTF into a high temporal frame and a low temporal frame, in accordance with embodiments of the present invention.

FIG. 13A is a flow chart depicting steps 211-214 for utilizing variable block size OBMC in the MCTF temporal high frames of FIG. 2, in accordance with embodiments of the present invention. Prior to step 211, the current frame has been configured into M blocks that include at least two differently sized blocks, wherein M is at least 9. Step 211 performs the variable size block matching (VSBM) to obtain the initial vectors for the motion blocks as is known in the art (e.g., see Ostermann, and Zhang, "Video Processing and Communications", Prentice-Hall, pp. 182-187 (2002)). Step 212 classifies the blocks in the current frame as being either I-BLOCKs or motion blocks. A "motion block" is defined to be a non I-BLOCK. Detection and classification of unconnected blocks (i.e., I-BLOCKs and P-BLOCKs) and uniconnected blocks was described supra in conjunction with steps 31-36 of FIG. 3. FIG. 15 describes infra the various categories of motion blocks including P-BLOCKs, DEFAULT blocks, and REVERSE blocks. Step 213 performs variable block size OBMC to provide an overlap smoothing for the motion blocks and the I-BLOCKs. In step 214, the motion field (i.e., the smoothed motion blocks and/or I-BLOCKs) generated in step 213 is processed in accordance with MCTF.

Figure 13B:
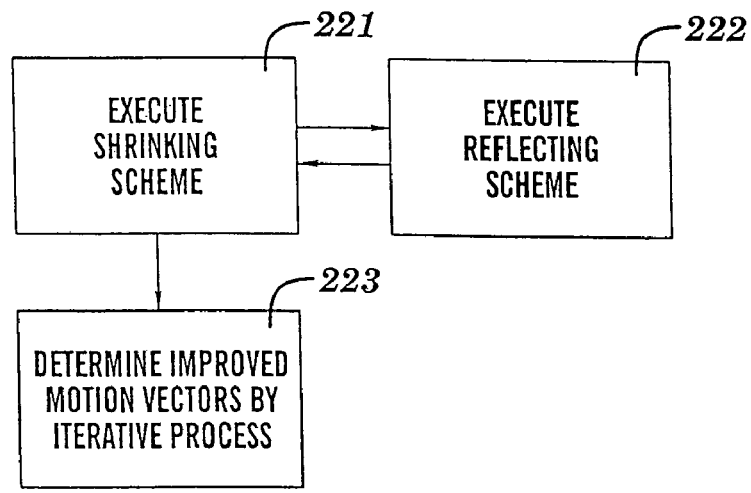
FIG. 13B is a flow chart describing the variable block-size OBMC processing step of FIG. 13A, in accordance with embodiments of the present invention.

FIG. 13B is a flow chart depicting steps 221-223 which describe the variable block size OBMC processing step 213 of FIG. 13A, in accordance with embodiments of the present invention. For a given self block and associated nearest neighbor block in the current frame, step 221 executes a shrinking scheme that generates a weighting window for the self block and its associated nearest neighbor block which takes into account whether the self block is a motion block or an I-BLOCK, and also takes into account whether the nearest neighbor block is a motion block or an I-BLOCK. If the nearest neighbor block is an I-BLOCK, the shrinking scheme of step 221 invokes step 222 which executes a reflecting scheme that impacts the generation of the weighting widows in a manner that accounts for the intrinsic inability of the nearest neighbor I-BLOCK to communicate with the reference frame.

The shrinking scheme execution step 221 is performed for all nearest neighbor blocks of the given self block, and then for all self blocks of the current frame in a sequence dictated by a predetermined scan order. Step 223 is executed, wherein an initial motion vector for each self block in the current frame has been utilized. Although said initial motion vectors for the self blocks were used to generate the weighting windows, said initial motion vectors may not be the optimum weighting windows inasmuch as a perturbed set of motion vectors may result in more accurate predictions of pixel values in the current frame when the generated weighting windows are taken into account. Accordingly, step 223 performs an iterative process such that each iteration perturbs the motion vectors in a manner that improves the accuracy of pixel values in the current frame in light of the weighting windows generated in step 222.

Steps 221-223 in FIG. 13B reflect a simplified description of the variable block size OBMC processing step 213 of FIG. 13A. Following the illustrative weighting window generation examples of FIGS. 16-18 and 21-22, FIG. 23 will present infra a flow chart that describes in detail embodiments of the variable block size OBMC processing of steps 221-222 of FIG. 13B. In addition, FIG. 24 will present infra a flow chart that describes in detail the iterative process for improving the motion vectors in step 223 of FIG. 13B.

Figure 14:
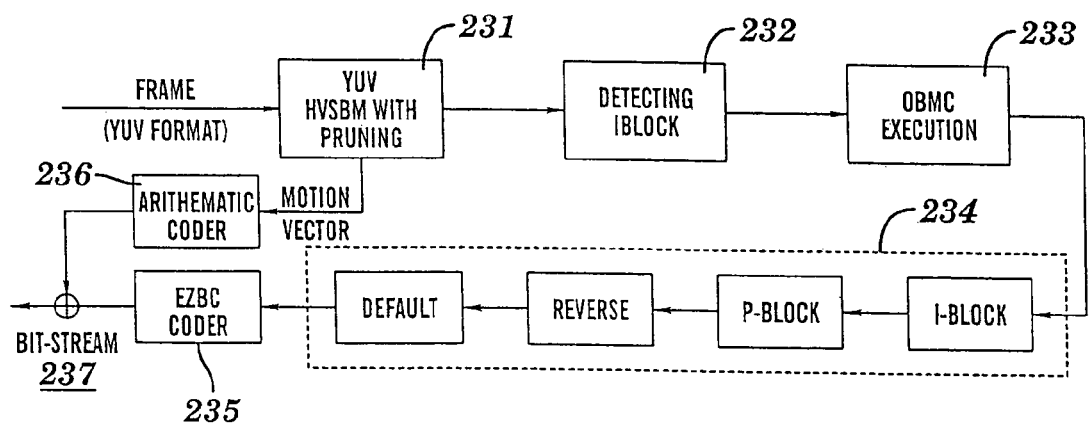
FIG. 14 is a block diagram of frame processing associated with the flow charts of FIGS. 13A-13B, in accordance with embodiments of the present invention.

FIG. 14 is a block diagram of frame processing associated with the flow charts of FIGS. 13A-13B, in accordance with embodiments of the present invention. FIG. 14 illustrates the following sequentially ordered processing: the component (YUV) hierarchical variable-size block matching (HVSBM) motion estimation 231 (which corresponds to step 211 of FIG. 13A); I-BLOCK detection 232 (which corresponds to step 212 of FIG. 13A); variable block size OBMC execution 233 (which is performed in step 213 of FIG. 13A); MTCF processing 234 (which corresponds to step 214 of FIG. 13A); and MC-EZBC coder processing 235. The HVSBM motion estimation 231 generates motion vectors which are processed by an arithmetic coder 236. A bit stream 237 is formed from coded output generated by the EZBC coder 235 and from coded output generated by the arithmetic coder 236.

In FIG. 14, the MCTF processing 234 sequentially comprises the processing of I-BLOCKs, P-BLOCKs, REVERSE blocks, and DEFAULT blocks. The REVERSE block prediction comprises a prediction of those blocks best predicted from the previous B frame. The pixels of the DEFAULT block includes those pixels actually taking part in the MC filtering, both for the 'predict' step for parent frame H and the 'update' step for parent frame L.

FIG. 15 depicts two successive input frames A and B to be transformed by the MCTF into a high temporal frame H and a low temporal frame L, in accordance with embodiments of the present invention. See FIG. 2 (and a discussion thereof supra) for a derivation of the H and L frames from frames A and B by the MCTF processing. In FIG. 2, however, a different choice is made for the temporal location of the H and L frames. In FIG. 2 the L frame is time referenced to that of the input frame A and the H frame is time referenced to that of the input frame B, whereas in FIG. 15 the H frame is time referenced to that of the input frame A and the L frame is time referenced to that of the input frame B. Actually, either set of time references has been found to work well and is present in modern MCTF based scalable video coders. The superscript "t" and "t−1" respectively denote a current time t and the previous time t−1. As indicated by the double arrow heads, the DEFAULT blocks participate in both predict (for frame H) and update (for frame L) processing, as mentioned supra. As indicated by single arrow heads, the PBLOCKs, REVERSE blocks and I-BLOCKs only affect one frame, namely the H frame. Update is not shown for these blocks. The I-BLOCK denotes a block employing spatial interpolation/prediction only as discussed supra. After I-BLOCK detection, the variable size OBMC execution 233 of FIG. 14 is performed.

In the OBMC framework, the present invention views any data received by the decoder prior to the decoding of a frame as a source of information about the true prediction scheme finally employed.

Figure 16:
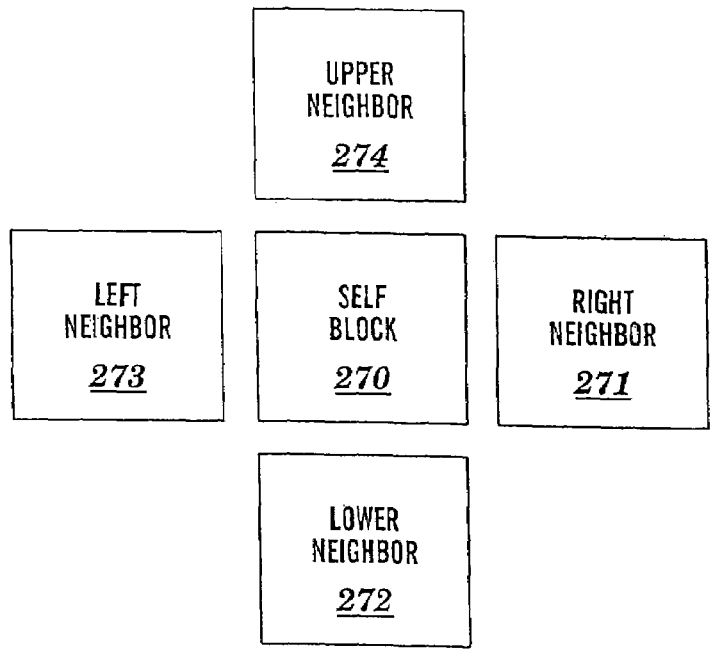
FIG. 16 depicts a self block and associated nearest neighboring blocks used by OBMC, in accordance with embodiments of the present invention.

FIG. 16 depicts a self block and four nearest neighbor blocks in the current frame, in accordance with embodiments of the present invention. The four nearest neighbor blocks of the self block 270 in FIG. 16 are a right nearest neighbor 271, a lower nearest neighbor 272, a left nearest neighbor 273, and an upper nearest neighbor 274. For the illustrated examples of FIGS. 17-18 discussed infra, the self block and its nearest neighbor blocks are assumed to have the same size. According to the preceding assumption, the weighting window used is symmetric left-to-right and top-to-bottom.

Figure 17A:
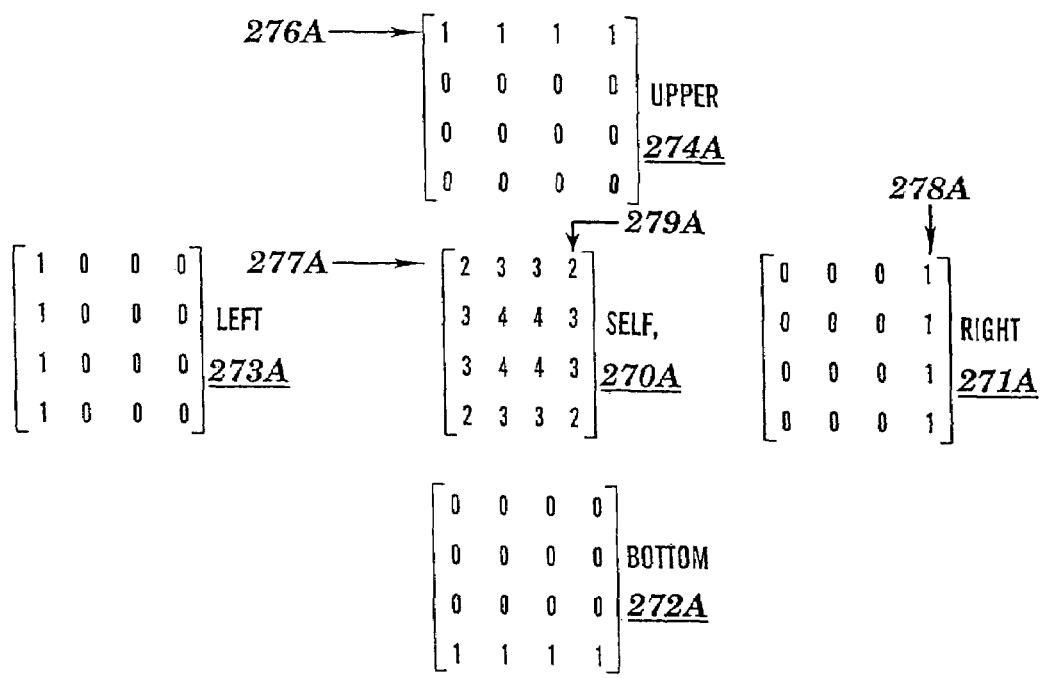
FIG. 17A illustrates 4×4 weighting windows, wherein a self block is a motion block, in accordance with embodiments of the present invention.

FIGS. 17A and 17B (collectively "FIG. 17") illustrate 4×4 weighting windows, in accordance with embodiments of the present invention. In FIG. 17A the self block is a motion block, and in FIG. 17B the self block is an I-BLOCK. FIG. 17A shows a weighting window 270A for the self block and its associated nearest neighbor weighting windows 271A, 272A, 273A, and 274A for the right nearest neighbor block, lower nearest neighbor block, left nearest neighbor block, and upper nearest neighbor block, respectively. FIG. 17B shows a weighting window 270B for the self block and its associated nearest neighbor weighting windows 271B, 272B, 273B, and 274B for the right nearest neighbor block, lower nearest neighbor block, left nearest neighbor block, and upper nearest neighbor block, respectively.

The following convention is used to represent the weighting windows in the examples of FIGS. 17-18 and 21-22, using FIG. 17A for illustrative purposes. For the self block weighting window 270A, the pixel weights shown in FIG. 17A are in the same relative pixel positions as are the corresponding pixel values at the physical pixel locations. For the nearest neighbor blocks, however, the pixel weights shown in FIG. 17A are ordered and displayed reflectively opposite the corresponding pixel values at the physical pixel locations. For example in FIG. 17A with respect to the self block weighting window 270A and its upper neighbor weighting window 274A, the uppermost row 276A of weights (1 1 1 1) of the upper neighbor weighting window 274A is for pixels in the top row 277A of the self block (in terms of physical pixel locations) weighting window 270A. As another example in FIG. 17A with respect to the self block weighting window 270A and its right neighbor weighting window 271A, the rightmost column 278A of weights (1 1 1 1) of the right neighbor weighting window 271A is for pixels in the rightmost column 279A of the self block 270A.

The preceding convention has the visual advantage that if a nearest neighbor weighting window is superimposed over the self block weighting window 270A, the indicated weight at a given matrix position in the nearest neighbor-block weighting window and the weight directly underneath this matrix position in the self-block weighting window are being used as weights for the same physical pixel in the OBMC calculation of the present invention. Thus, when all nearest neighbor weighting windows are superimposed over the self block weighting window 270A, the sum of the weights at each matrix position is 4, or generally N for N×N blocks. For example in FIG. 17A, when all nearest neighbor weighting windows are superimposed over the self block weighting window 270A at the upper-right corner matrix position, the weights for the self block weighting window 270A, right neighbor weighting window 271A, lower neighbor weighting window 272A, left neighbor weighting window 273A, and upper neighbor weighting window 274A are 2, 1, 0, 0, and 1, respectively, which are summed to equal 4.

For a weighting window to be a probability weighting window, the sum of the weights in the weighting window would be equal to 1, which would result in the weights having a fractional or decimal value less than or equal to 1. For simplicity of representing the weights numerically, the weighting windows used in the illustrative examples herein in FIGS. 17-20 are normalized such that the sum of the weights is equal to N (instead of equal to 1) for a N×N weighting window size, with the understanding that the weighting window should be implemented as a probability weighting window (or its equivalent) when the weights in the weighting window are used to calculate pixel values.

In FIG. 17A with a fixed 4×4 blocksize, the self block is a motion block and two-dimensional (2-D) bilinear (i.e., straight-line) interpolation is used to determine the weights in the self block weighting window 270A and the nearest neighbor weighting windows 271A, 272A, 273A, and 274A. The 2-D bilinearly interpolated pixel values correspond to linear interpolation along the straight line between the center of the self block and the center of the neighboring block. Since the 2-D bilinear interpolation is two-dimensional, a bilinearly interpolated weight is the product of such interpolated values in two mutually orthogonal directions. The weights resulting from the 2-D bilinear interpolation have been rounded to the nearest integer, subject to the constraint that the normalization condition (i.e., the sum of the weights associated with each pixel is equal to N) is satisfied. If one or more self block boundaries coincide with a frame boundary, then at least one side of the self block will not have a nearest neighbor block and the resultant bilinear weighting window weights will therefore differ from the bilinear weighting window weights that exist when no self block boundary coincides with a frame boundary. Studies indicate that the 2-D bilinear interpolation weighting window is nearly as accurate as an iterated optimal weighting window. However, other forms of interpolation (e.g., biquadratic interpolation, exponential interpolation, etc.) may be used instead of bilinear interpolation for the weighting windows of FIG. 17A or for weighting windows of any other embodiment discussed herein such that bilinear interpolation is disclosed as being used.

In FIG. 17B, with fixed 4×4 blocksize, the self block is an I-BLOCK. The weights in the weighting windows in FIG. 17B are derived from the weights in the weighting windows in FIG. 17A by extracting portions of the weights in the self-block weighting window in and adding said portions to selected weights in the nearest neighbor weighting windows, subject to the constraint that the normalization condition is satisfied. The "portion of the weights" adjustment was experimentally determined in terms of giving a good visual error performance and was not optimized in any way. Other "portion of the weights" adjustments may be utilized if validated or substantiated by experimental and/or analytical methodology. Said selected weights are weights which are near the block boundaries. The preceding modification of the weights of FIG. 17A when the self block is an IBLOCK facilitates a more aggressive smoothing of the interpolated pixel values at self block boundaries, by providing relatively higher weights to the neighbor blocks. The weight distribution method used for FIG. 17B is a "radiation scheme" that radiates weight components outward from the self cell to its neighbor cells.

For FIG. 17A and/or FIG. 17B, once the nearest neighbor weighting window has been determined for the right nearest neighbor, the nearest neighbor weighting window for the left nearest neighbor may be determined by exploiting the reflective symmetry shown in FIG. 16, or may be calculated via bilinear interpolation. Similarly, once the nearest neighbor weighting window has been determined for the bottom nearest neighbor, the nearest neighbor weighting window for the top nearest neighbor may be determined by exploiting the reflective symmetry shown in FIG. 16, or may be calculated via bilinear interpolation.

The example of FIG. 17 illustrates an embodiment, wherein the self block is an I-BLOCK, and wherein the generated window of the self block consists of first pixel weights and second pixel weights. The first pixel weights are less than what the first pixel weights would have been if the self block had been a motion block, and the second pixel weights are equal to what the second pixel weights would have been if the self block had been the motion block. For example, the first pixel weights of "2" in selected matrix positions of the self I-BLOCK 270B of FIG. 17B are less than the weights of "3" in the corresponding selected matrix positions of the motion block 270A of FIG. 17A, and the second pixel weights are the remaining pixel weights which are the same weights (i.e., same weight magnitudes) in the self I-BLOCK 270B of FIG. 17B and the motion block 270A of FIG. 17A.

Accordingly, generating the weighting window for the self block may comprise: generating a first weighting window for the self block as if the self block is the motion block (e.g., generating the motion block 270A of FIG. 17A); and generating the weighting window for the self block from the first weighting window by reducing weights in the first weighting window (e.g., generating the self I-BLOCK 270B of FIG. 17B by reducing the weights in the motion block 270A of FIG. 17A).

Moreover, in the preceding embodiment illustrated by the example of FIG. 17, the generated window of each neighbor block of the self block may consist of third pixel weights and fourth pixel weights, wherein the third pixel weights are greater than what the third pixel weights would have been if the self block had been the motion block, and wherein the fourth pixel weights are equal to what the fourth pixel weights would have been if the self block had been the motion block. For example, said third weights are illustrated by selected portions of the right, bottom, left, and upper neighbor block weights which are greater in magnitude in FIG. 17B than in FIG. 17A, and said fourth weights are illustrated by the remaining portions of the right, bottom, left, and upper neighbor block weights which are equal in magnitude in FIG. 17B and FIG. 17A.

FIGS. 18A and 18B (collectively "FIG. 18") illustrate a 8×8 weighting windows wherein the associated self block is a motion block and an IBLOCK, respectively, in accordance with embodiments of the present invention. FIG. 18A shows a weighting window 270C for the self block and its associated nearest neighbor weighting windows 271C, 272C, 273C, and 274C for the right nearest neighbor block, lower nearest neighbor block, left nearest neighbor block, and upper nearest neighbor block, respectively. FIG. 18B shows a weighting window 270D for the self block and its associated nearest neighbor weighting windows 271D, 272D, 273D, and 274D for the right nearest neighbor block, lower nearest neighbor block, left nearest neighbor block, and upper nearest neighbor block, respectively. The methods for generating the weighting windows in FIG. 18 are the same as the methods used to generate the weighting windows in FIG. 17 as described supra.

Shrinking Scheme

As explained supra in conjunction with FIGS. 11-12, the self block and its associated nearest neighbor blocks may all have the same size, or the size of the self block may differ from the size of at least one of its associated nearest neighbor blocks. Essentially, there are three embodiments for a nearest neighbor block associated with of a given self block:

(a) The spatial nearest neighbor block size is the same as that of the self block (e.g., self block 241 and its neighbor block 242 in FIG. 14), which is the "standard same block-size" case analyzed supra in conjunction with FIGS. 17-18. Thus, the weighting windows for this embodiment are generated as described supra in conjunction with FIGS. 17-18.

Figure 19:
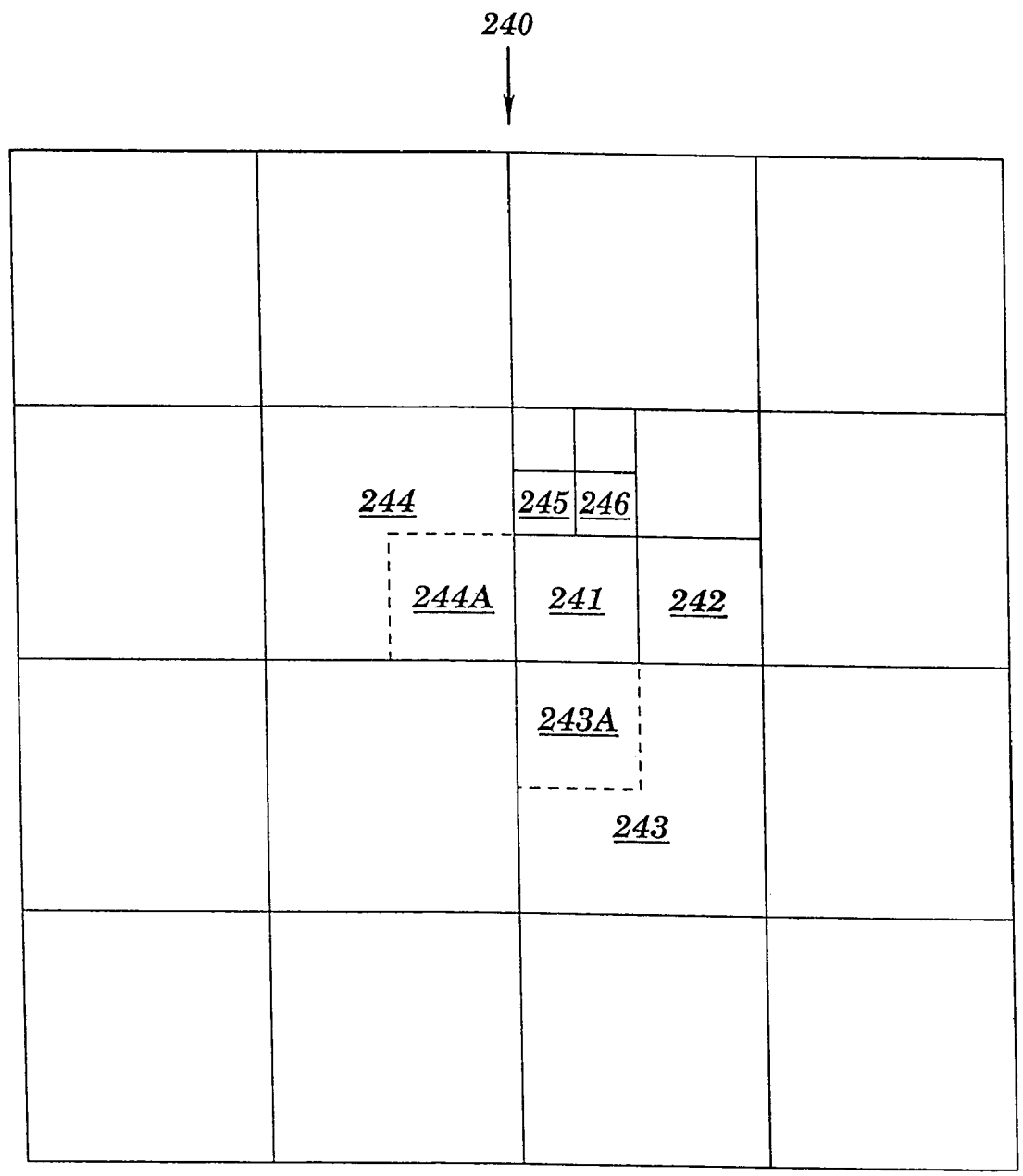
FIG. 19 shows the frame of FIG. 11 such that portions of selected nearest neighbor blocks are depicted, said selected nearest neighbor blocks being larger than their associated self block, in accordance with embodiments of the present invention.

(b) The spatial nearest neighbor block size is larger than that of the self block (e.g., self block 241 and its neighbor blocks 243 and 244 in FIG. 11), which is treated by utilizing the portion of the larger nearest neighbor block that is the same size as the self block, wherein said portion occupies the same space within the current frame as does the nearest neighbor block of the standard same block-size case (a). To illustrate, FIG. 19 depicts frame 240 of FIG. 11, wherein portions 243A and 243B of nearest neighbor blocks 243 and 244 are shown, in accordance with embodiments of the present invention. Portions 243A and 244A have the same size as self block 241 and occupy the space within the frame 240 appropriate to the standard same block-size case. For this embodiment, the portions 243A and 244A of nearest neighbor blocks 243 and 244, respectively, are utilized as effective nearest neighbor blocks to the self block 241. Thus, the portion 243A portion of the neighbor block 243 is the only portion of the neighbor block 243 whose weighting window impacts a predicting of pixel values in the self block 241 during the performing of OBMC on the self block 241. Similarly, the portion 244A of the neighbor block 244 is the only portion of the neighbor block 244 whose weighting window impacts a predicting of pixel values in the self block 241 during the performing of OBMC on the self block 241. In effect, the present invention "shrinks" the blocks 243 and 244 to the respective portions 243A and 244A. The self block 241 and the neighbor block 243 (or 244) may each be a motion block, wherein the generated weighting window of the portion 243A (or 244A) of the neighbor block 243 (or 244) may consist of bilinearly interpolated weights. The weighting windows for this embodiment are generated as described supra in conjunction with FIGS. 17-18 for the standard same block-size case. However, the motion vector associated with the larger nearest neighbor block are used to provide the weighted neighbor estimate. For example with reference to FIG. 12, the motion vector 253 would be used to locate the block 263 in the reference frame 260 in conjunction with utilizing the portion 243A (see FIG. 19) of the larger neighbor block 243 for processing the self block 241.

Figure 20:
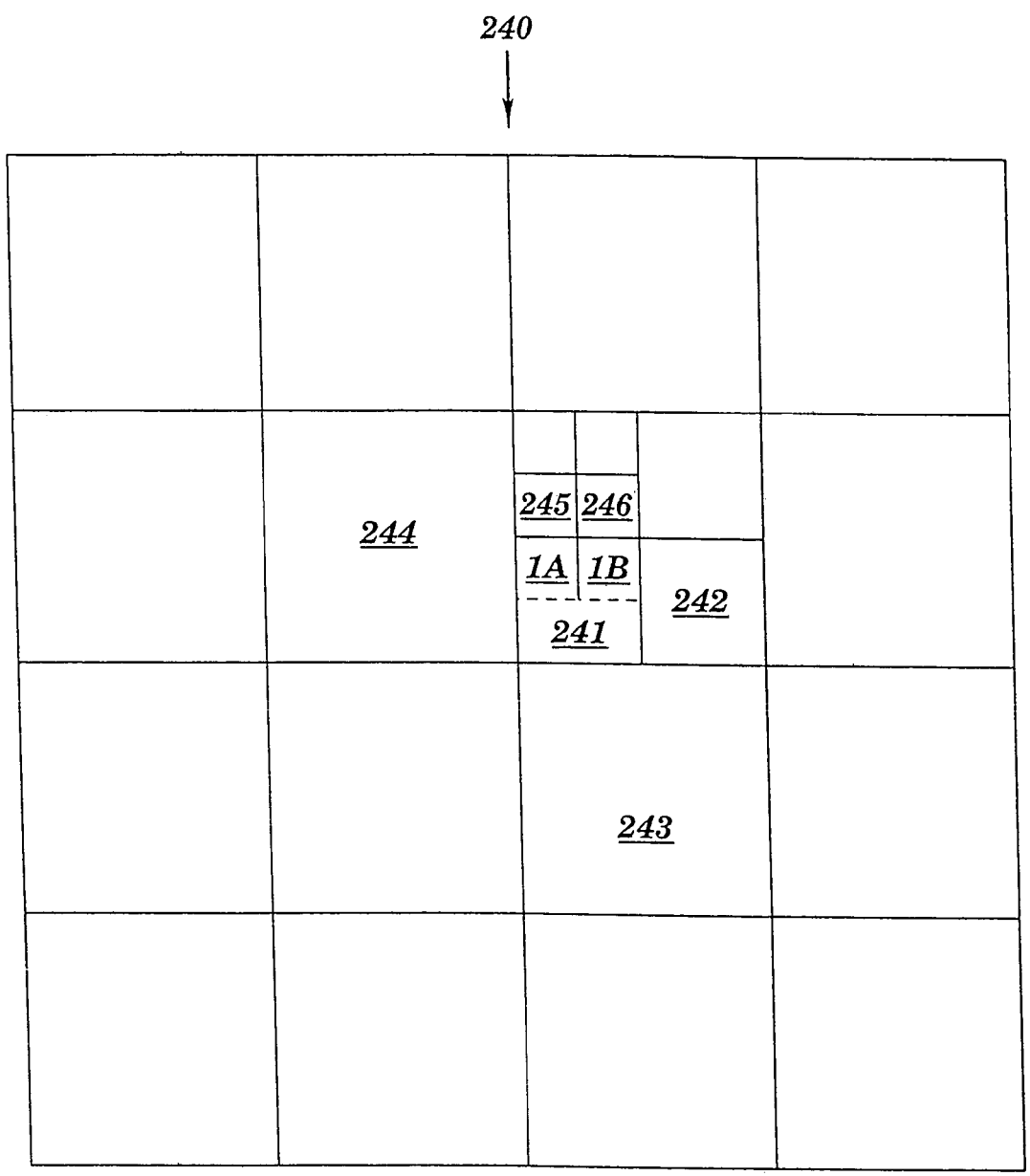
FIG. 20 shows the frame of FIG. 11, depicting portions of a self block that is larger than associated nearest neighbor blocks, in accordance with embodiments of the present invention.

(c) The spatial nearest neighbor block size is smaller than that of the self block (e.g., self block 241 and its neighbor blocks 245 and 246 in FIG. 11), which necessitates choosing a portion of the self block to be of the same size as the smaller nearest neighbor block and adjacently located with respect to smaller nearest neighbor block. To illustrate, FIG. 20 depicts frame 240 of FIG. 11, wherein portions 1A and 1B of self block 241 are shown, in accordance with embodiments of the present invention. Portions 1A and 1B have the same size as (and are located adjacent to) the nearest neighbor blocks 245 and 246, respectively. For this embodiment, the portions 1A and 1B of the self block 241 are utilized as effective self block portions with respect to the nearest neighbor blocks 245 and 246, respectively. The portion 1A of the self block 241 is the only portion of the self block 241 at which a predicting of pixel values is impacted by the weighting window of the neighbor block

245 during the performing of OBMC on the portion 1A of the self block 241. Similarly, the portion 1B of the self block 241 is the only portion of the self block 241 at which a predicting of pixel values is impacted by the weighting window of the neighbor block 246 during the performing of OBMC on the portion 1A of the self block 241. In effect, the present invention "shrinks" the self block 241 so as to utilize only the portions 1A and 1B.

For the embodiment in which the spatial nearest neighbor block size is smaller than that of the self block, the weighting windows are generated as described infra in conjunction with the shrinking scheme examples of FIGS. 21-22, wherein each utilized portion of the self block comprise an affected area and an unaffected area such that the affected area is affected by the smaller nearest neighbor block and the unaffected area is not affected by the smaller nearest neighbor block. For some applications, the affected area may comprise half of the smaller nearest neighbor blocksize, both horizontally and vertically. The weights in the weighting window of the affected area of the utilized portion of the self block and the corresponding portion of the weighting window of the smaller nearest neighbor block are the same as is derived from the standard same block-size case. The weights in the portion of the weighting window of the smaller nearest neighbor block that corresponds to the unaffected area of the utilized portion of the self block are "removed" and then set equal to zero. The weights in the unaffected area of the utilized portion of the self block are incremented (relative to the standard same block-size case) by said removed weights from the corresponding portion of the weighting window of the smaller nearest neighbor block, as will be illustrated infra in conjunction with the example of FIG. 22.

Since a self block may have a different motion vector from its smaller nearest neighbor, this shrinking scheme reduces the smoothing at a motion discontinuity, since this shrinking scheme reduces the smoothing radius to be compatible with the smaller nearest neighbor block size.

For each self block, the steps of analyzing the relative block size of its nearest neighbors are repeated for each such nearest neighbor. The self blocks are sequentially processed in accordance with a predetermined scan order.

Figures 21A, 21B, 21C:
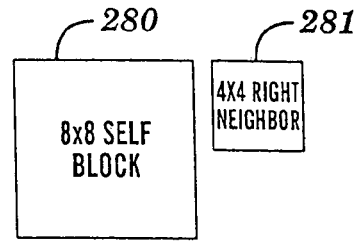
FIGS. 21A-21C depict weighting windows for a self block and an associated smaller nearest neighboring block used by OBMC in conjunction with a shrinking scheme wherein the nearest neighboring block is a motion block, in accordance with embodiments of the present invention.

FIGS. 21A-21C (collectively, "FIG. 21") depict weighting windows for a self block and an associated smaller nearest neighboring block used by OBMC in conjunction with a shrinking scheme, wherein the nearest neighboring block is a motion block, in accordance with embodiments of the present invention. In FIG. 21A, the self block 280 is an 8×8 block, and its right neighbor block 281 is a 4×4 block.

FIG. 21B provides a self block weighting window 280A and its right neighbor weighting window 281A, respectively associated with the self block 280 and the right neighbor block 281 of FIG. 21A. In FIG. 21B, the self block weighting window 280A includes a utilized portion 282A that is utilized in the OBMC procedure in conjunction with the right neighbor weighting window 281A. The utilized portion 282A is a "shrinked" form of the self block weighting window 280A and has the same size as the right neighbor weighting window 281A.

In FIG. 21B, the numerical weights shown are not the final weights but rather are the standard initial weights used for computing the final weights. The final weights are shown in FIG. 21C. In particular, the initial weights in FIG. 21B are the weights pertinent to the standard same block-size case. Thus, the weights in the self block weighting window 280A of FIG. 21B are the same bilinear weights that appear in the weighting window 270C of FIG. 18A, and the weights in the right neighbor weighting window 281A of FIG. 21B are the same bilinear weights that appear in the upper-right quadrant of the weighting window 271C of FIG. 18A.

In FIG. 21B, the utilized portion 282A consists of an affected area 283A and an unaffected area 284A. The pixels of the self block that relate to the affected area 283A are affected in the OBMC procedure by an affecting area 285A of the right neighbor weighting window 281A. The pixels of the self block that relate to the unaffected area 284A are unaffected in the OBMC procedure by an unaffecting area 286A of the right neighbor weighting window 281A.

The weights in FIG. 21C are derived from the weights in FIG. 21B as follows. The weights in the affecting area 285A and the affected area 283A in FIG. 21C are the same as in FIG. 21B. The weights in the unaffecting area 286A in FIG. 21B are added to the corresponding weights in the unaffected area 284A in FIG. 21B to form the weights in the unaffected area 284A in FIG. 21C, and the weights in the unaffecting area 286A in FIG. 21C are set to zero.

The preceding shrinking scheme illustrated in FIG. 21 avoids over smoothing at motion discontinuities. Since a large block may have a different a motion vector from its small nearest neighbors, the shrinking scheme can reduce over-smoothing at a motion discontinuity. The shrinking scheme can be applied to rectangular as well as the square block sizes discussed supra and the rectangular block sizes are thus within the scope of the present invention. Note, however, that a simple quadtree decomposition may be used to generate an array of square blocks only. An array of rectangular blocks may be effectuated by a horizontal and/or vertical splitting algorithm (e.g., splitting an 8×8 block into two 8×4 blocks or two 4×8 blocks).

For the preceding shrinking scheme illustrated in FIG. 21, the nearest neighbor block is a motion block characterized by a motion vector. In contrast, a nearest neighbor block that is an I-BLOCK has no associated motion vector. If the nearest neighbor I-BLOCK does not participate in the OBMC smoothed prediction, however, said nearest neighbor I-BLOCK may create some block artifacts with nearest neighboring motion blocks (i.e., DEFALLT, P-BLOCK, or REVERSE block). Accordingly, the reflecting scheme of the present invention incorporates a nearest neighbor I-BLOCK into the framework of OBMC as discussed infra.

Reflecting Scheme

The reflecting scheme is used if a nearest neighbor is an I-BLOCK. The reflecting scheme reflects the nearest neighbor I-BLOCK weighting back on the self block. This effectively means that the self block's motion vector is used in place of the missing motion vector of the I-BLOCK.

Figures 22A, 22B, 22C:
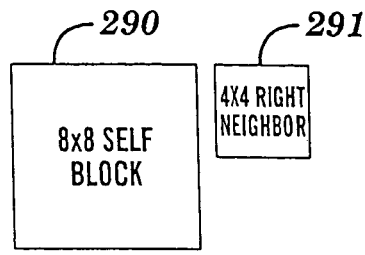
FIGS. 22A-22B depict weighting windows for a self block and an associated smaller nearest neighboring block used by OBMC in conjunction with a reflecting scheme wherein the nearest neighboring block is an I-BLOCK, in accordance with embodiments of the present invention.

FIGS. 22A-22C (collectively, "FIG. 22") depict weighting windows for a self block and an associated smaller nearest neighboring block used by OBMC in conjunction with a shrinking scheme, wherein the nearest neighboring block is an I-BLOCK, in accordance with embodiments of the present invention. In FIG. 22A, the self block 290 is an 8×8 block, and its right neighbor block 291 is a 4×4 block.

FIG. 22B provides a self block weighting window 290A and its right neighbor weighting window 291A, respectively associated with the self block 290 and the right neighbor block 291 of FIG. 22A. In FIG. 22B, the self block weighting window 290A includes a utilized portion 292A that is utilized in the OBMC procedure in conjunction with the right neighbor weighting window 291A. The utilized portion 292A has the same size as the right neighbor weighting window 291A.

In FIG. 22B, the numerical weights shown are not the final weights but rather are the standard initial weights used for computing the final weights. The final weights are shown in FIG. 22C. In particular, the initial weights in FIG. 22B are the weights pertinent to the standard same block-size case. Thus, the weights in the self block weighting window 290A of FIG. 22B are the same bilinear weights that appear in the weighting window 270C of FIG. 18A, and the weights in the right neighbor weighting window 291A of FIG. 22B are the same bilinear weights that appear in the upper-right quadrant of the weighting window 271C of FIG. 18A The weights in FIG. 22C are derived from the weights in FIG. 22B as follows. The weights in the right neighbor weighting window 291A in FIG. 22B are added to the utilized portion 292A in FIG. 22B to form the weights in the utilized portion 292A in FIG. 22C, and the weights in the right neighbor weighting window 291A in FIG. 21C are set to zero.

Experiments conducted by the inventors of the present invention show that if nearest neighbor I-BLOCKs are not included in the OBMC framework, there may be visible block boundaries between I-BLOCKs and motion compensated blocks, which is explained by the fact that the motion compensated blocks are interframe compensated whereas I-BLOCKs are intraframe interpolated/predicted. After nearest neighbor I-BLOCKs are incorporated into the OBMC framework as discussed supra, most of the block boundaries are eliminated and a slight Peak Signal to Noise Ratio (PSNR) gain is observed.

OBMC Weighting Window Algorithm

Figure 23:
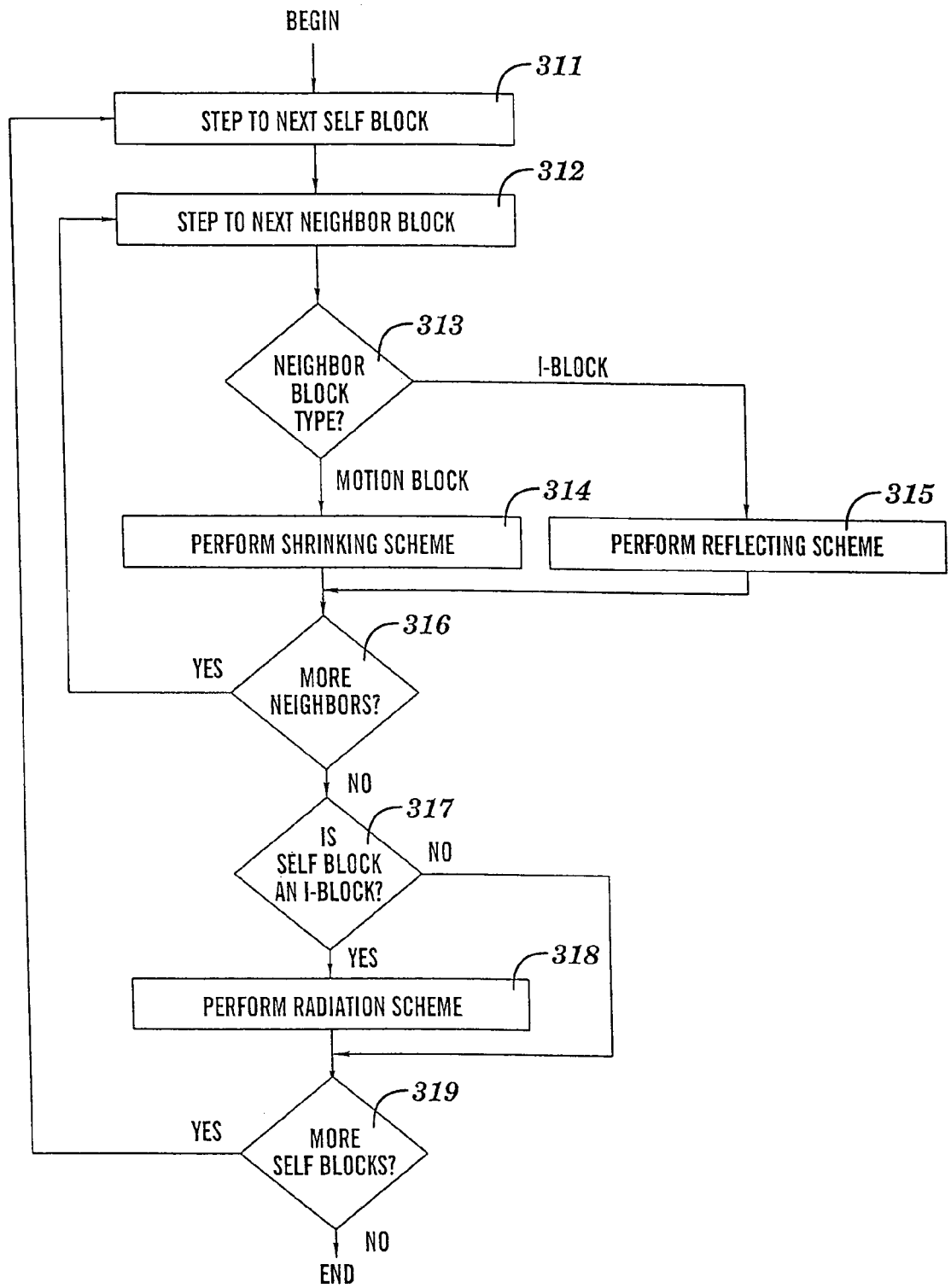
FIG. 23 is a flow chart for calculating weighting windows for variable block-size OBMC, in accordance with embodiments of the present invention.

Based on the preceding discussions of weighting windows for OBMC, FIG. 23 is a flow chart depicting steps 311-319 of an algorithm for calculating weighting windows for variable block size OBMC, in accordance with embodiments of the present invention. The flow chart of FIG. 23 includes details of steps 221-222 in the flow chart of FIG. 11B discussed supra. The flow chart of FIG. 23 sequentially processes all self blocks in the current frame according to a predetermined scan order.

Step 311 steps to the next self block to process which initially is the first block to be scanned according to the predetermined scan order. The next self block is processed with respect to its neighbor blocks consisting of the nearest neighbor blocks of the next self block. The neighbor blocks of the self block (i.e., next self block) comprise a first neighbor block. The self block and the first neighbor block may each be a motion block. The self block and the first neighbor block may each be an I-BLOCK. The self block may be a motion block and the first neighbor block may be an I-BLOCK. The self block may be an I-BLOCK and the first neighbor block may be a motion block.

For the self block established in step 311, step 312 steps to the next neighbor block which initially is a first neighbor block of a sequence of nearest neighbor blocks around the self block established in step 311.

Step 313 determines whether the neighbor block is a motion block or an I-BLOCK.

If step 313 determines that the neighbor block is a motion block then step 314 performs the shrinking scheme, followed by execution of step 316. The shrinking scheme generates the weighting window for the self block and the neighbor block, based on whether the size of the neighbor block is equal to, larger than, or smaller than the size of the self block as discussed supra.

If step 313 determines that the neighbor block is an I-BLOCk then step 315 performs the reflecting scheme, followed by execution of step 316. The reflecting scheme generates the weighting window for the self block and the neighbor block in accordance with the procedure described supra in conjunction with FIG. 22.

Step 316 which determines whether there are more neighbor blocks of the self block to process.

If step 316 determines that there are more neighbor blocks of the self block to process then the algorithm loops back to step 312 to step to the next neighbor block to process.

If step 316 determines that there are no more neighbor blocks of the self block to process then step 317 is executed.

Step 317 determines whether the self block is an I-BLOCK. If step 317 determines that the self block is not an I-BLOCK, then step 319 is executed. If step 317 determines that the self block is an I-BLOCK, then step 318 performs the radiation scheme described supra in conjunction with FIG. 17B to modify the weighting window of the self block and its neighbor blocks, followed by execution of step 319.

Step 319 determines whether there are more self blocks in the frame to process. If step 319 determines that there are more self blocks in the frame to process, then the algorithm loops back to step 311 to step to the next self block to process. If step 319 determines that there are no more self blocks in the frame to process, then the algorithm ends.

Iterating on OBMC

OBMC allows the nearest neighboring motion vectors to affect the prediction error in the self block, and that makes such a decoupled estimation suboptimal. Moreover, OBMC specifies a non-causal nearest neighborhood, so there is no block scanning order such that, for every block, all its nearest neighbor blocks are scanned before it. Thus, the present invention uses an iterative estimation or search procedure for optimized motion estimation and spatial interpolation/prediction mode selection, which ensures that the mean absolute distortion (MAD) converges to a local minimum.

For each pixel location s (which is a two-dimensional spatial vector) in a self block b, a residual error r(s) for pixel location s is computed as, $$r(s) = I(s) - \sum_{v_s^k(i) \neq v_b^k} h_{1 or 2}(i)\tilde{I}(s - v_s^k(i)), \qquad (2)$$

where the index i effectuates a summation over the nearest neighbors of the self block b, and k is an iteration index. In Equation (2), the $h_{1\ or\ 2}(i)$ are the weighting window coefficients (i.e., weights) of the neighbor blocks i, wherein $h_1(i)$ is used as the weighting window when the self block b is a motion block, and wherein $h_2(i)$ is used as the weighting window when the self block b is an I-BLOCK. In Equation (2), $v_s(i)$ is a motion vector for the neighbor block i at pixel location s, and I(s) is the true pixel value at pixel location s, and $\tilde{I}$ denotes an interpolated value (needed because of sub-pixel accuracy) in the reference frame for the neighbor block pixel. The residual error image r(s) is the motion compensation error that results when vector $v_b^k$, namely the motion vector from the self block b or the spatial interpolation/prediction for the block, is omitted and all the nearest neighbors' motion vectors are fixed. Then the present invention further optimizes $\hat{v}_b$ for motion blocks or further optimizes $\hat{m}_b$, the spatial interpolation mode, from the spatial interpolation modes permitted for I-BLOCKs, according to, $$\hat{v}_b = \arg\min_v \sum_{s(j) \in w_b} |r(s(j)) - h_1(j)\hat{I}_{k-1}(s(j) - v_b)| \quad (3)$$

$$\hat{m}_b = \arg\min_m \sum_{s(j) \in w_b} |r(s(j)) - h_2(j)\bar{I}_k(s(j))| \quad (4)$$

Here $\hat{v}_b$ are the conditional best motion vector, and $\hat{m}_b$ are the conditional best spatial interpolation/prediction mode for block b, $\hat{I}_{k-1}(s(j)-v_b)$ is the motion compensated value with the motion vector from the block b, and $\bar{I}_k(s(j))$ is the spatial interpolation/prediction value from self block b's nearest neighbors.

The OBMC iterations are controlled by the design parameters $\alpha$ and $\beta$: i.e., a predetermined total or maximum number of iterations $\alpha$ and an adjustment distance $\beta$ for the motion vectors at each iteration. For example $\alpha=4$ may be chosen. For example, motion vector perturbation parameter $\beta=2$ (corresponding to motion vector perturbations in proportionality to a fraction of a pixel unit in the orthogonal X and Y directions (e.g., horizontal and vertical directions, respectively): −4/8, −2/8, 0, +2/8, +4/8) may be chosen. Since the X and Y perturbations are independent, $\beta=2$ represents the preceding 5 perturbations in each of the X and Y directions for a total of 25 different directions of the motion vector at each iteration. Equations (3) and (4) determine which of the 25 motion vector perturbations is the best choice for the motion vector at each self block. When the best motion vector at each self block is so determined at a given iteration, said best motion vector is perturbed in accordance with $\beta$ in the next iteration to determine a further improved value of the motion vector at each self block. The convergence speed is very fast, but it can be switched off to reduce computational complexity, resulting in a modest suboptimality, depending on the video clip.

Since bi-directional color HVSBM runs on both luminance and chrominance data, it follows naturally that the OBMC iterations may be applied to YUV simultaneously. U and V are sub-sampled frame data after some transform from RGB data. Thus, the weighting windows used for U and V are also sub-sampled versions of those used for Y.

Based on the preceding discussion, the iterative estimation approach of the present invention for OBMC ("OBMC iterations") computes successively improved sets of motion vectors for each self block of the current frame for a fixed number ($\alpha$) of iterations or until a convergence criteria is satisfied.

Figure 24:
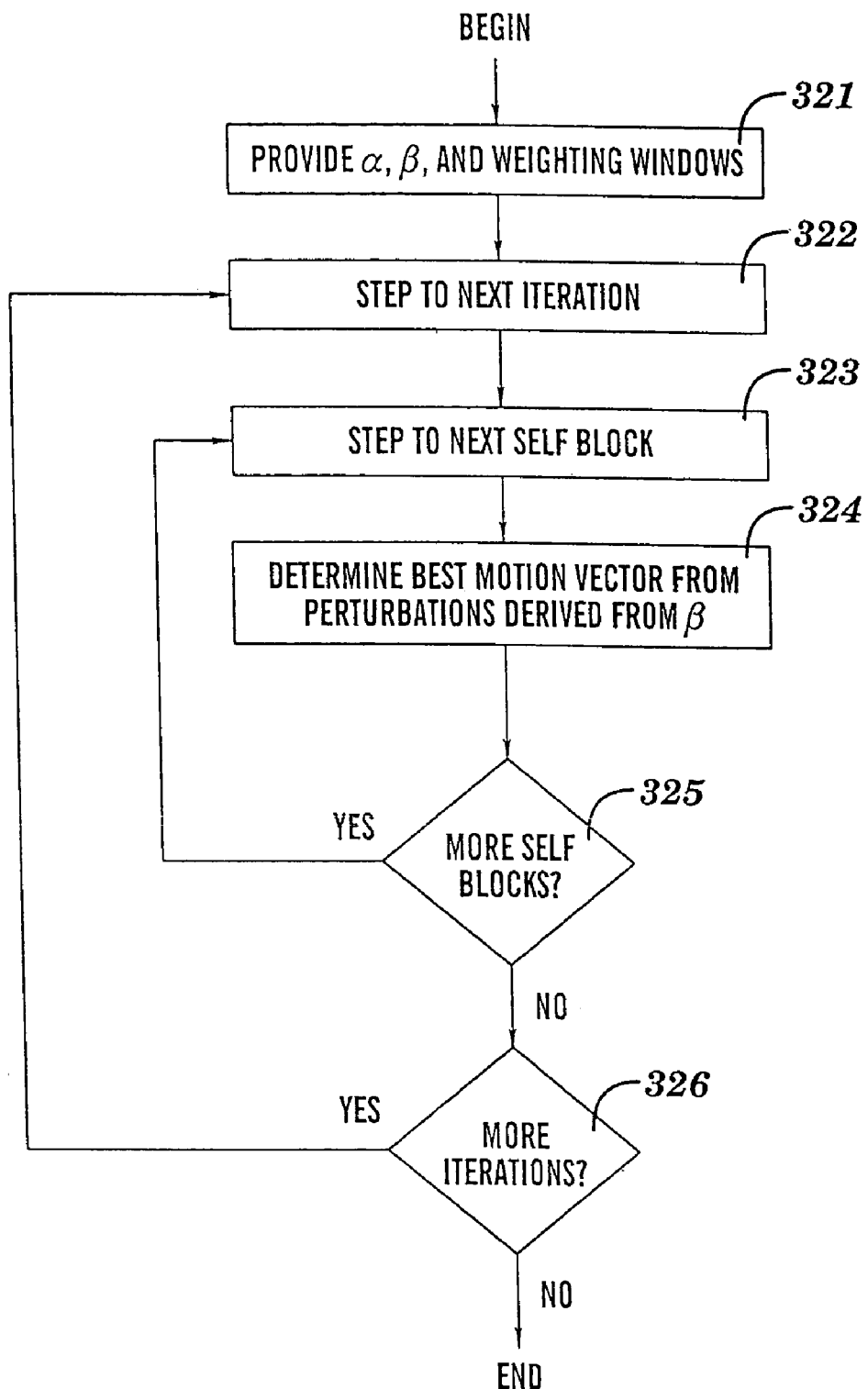
FIG. 24 is a flow chart for calculating successively improved motion vectors for the self blocks of a current frame processed according to variable block size OBMC using the probability weighting windows calculated according to according to the methodology described by the flow charts of FIGS. 13A, 13B, and 23, in accordance with embodiments of the present invention.

FIG. 24 is a flow chart depicting steps 321-326 of an algorithm for calculating successively improved motion vectors for the self blocks of a current frame processed according to variable block size OBMC using the weighting windows calculated according to the methodology described by the flow charts of FIGS. 13A, 13B, and 23, in accordance with embodiments of the present invention. The calculated weighting windows constitute input to the OBMC iterations and do not change during the OBMC iterations.

Step 321 provides input, namely $\alpha$, $\beta$, and the weighting windows.

Step 322 steps to the next iteration to execute which initially is the first iteration.

For the iteration established in step 322, step 323 steps to the next self block to process which initially is the first block to be scanned according to a predetermined scan order.

Step 324 determines the best motion vector for the self block selected from the perturbed $\beta$-based motion vectors, using Equations (3) or (4) in conjunction with Equation (2).

Step 325 determines whether there are more self blocks in the frame to process. If step 325 determines that there are more self blocks in the frame to process, then the algorithm loops back to step 323 to step to the next self block to process. If step 325 determines that there are no more self blocks in the frame to process, then step 326 is next executed.

Step 326 determines whether there are more iterations to perform.

If step 326 determines that there are more iterations to perform then the algorithm loops back to step 322 to step to the next iteration.

If step 326 determines that there are no more iterations to perform then the algorithm ends. There may be no more iterations to perform, because the number of iteration performed is equal to $\alpha$. There may also be no more iterations to perform, because a predetermined convergence criteria for the updated motion vectors has been satisfied. For example, a convergence criteria may be, inter alia, that the mean square fractional change in the motion vectors (individually at each self block, or summed over all self blocks) from the immediately previous iteration to the present iteration is less than a predetermined tolerance. In first embodiments, only $\alpha$ is used in step 326 to determine whether there are more iterations to perform. In second embodiments, only a convergence criteria is used in step 326 to determine whether there are more iterations to perform. In third embodiments, both $\alpha$ and a convergence criteria are used in step 326 to determine whether there are more iterations to perform.

Modification of Lifting-Based MCTF

The present invention does OBMC in a lifting implementation for DEFAULT blocks, i.e. with the prediction and update steps as normal in order to reduce the noise in the area of good motion. The specific equations for OBMC in lifting implementation are as follows, $$H[m,n] = \frac{1}{\sqrt{2}} A[m,n] - \frac{1}{\sqrt{2}} \sum_k h_k[m,n] \tilde{B}[m - d_{mk}, n - d_{nk}], \quad (5)$$

$$L[m - \bar{d}_m, n - \bar{d}_n] = \tilde{H}[m - \bar{d}_m + d_m, n - \bar{d}_n + d_n] + \quad (6)$$
$$\sqrt{2} B[m - \bar{d}_m, n - \bar{d}_n].$$

OBMC regards the motion vector field $(d_m, d_n)$ as random process. That means that pixel B[m, n] in frame B has motion vector $(d_{mk}, d_{nk})$ with probability $h_k[m, n]$ from its corresponding probability window as stated earlier, and is compensated by the weighted average of the predicted sub-pixels. In Equations (5)-(6), $(\bar{d}_m, \bar{d}_n)$ is the nearest integer to $(d_m, d_n)$. Although the form of the low temporal frame seems the same as that without OBMC, actually OBMC affects both high temporal frame and low temporal frame. The low temporal frames from OBMC are still visually preferred and more suitable for further stages of MCTF.

Computer System

Figure 25:
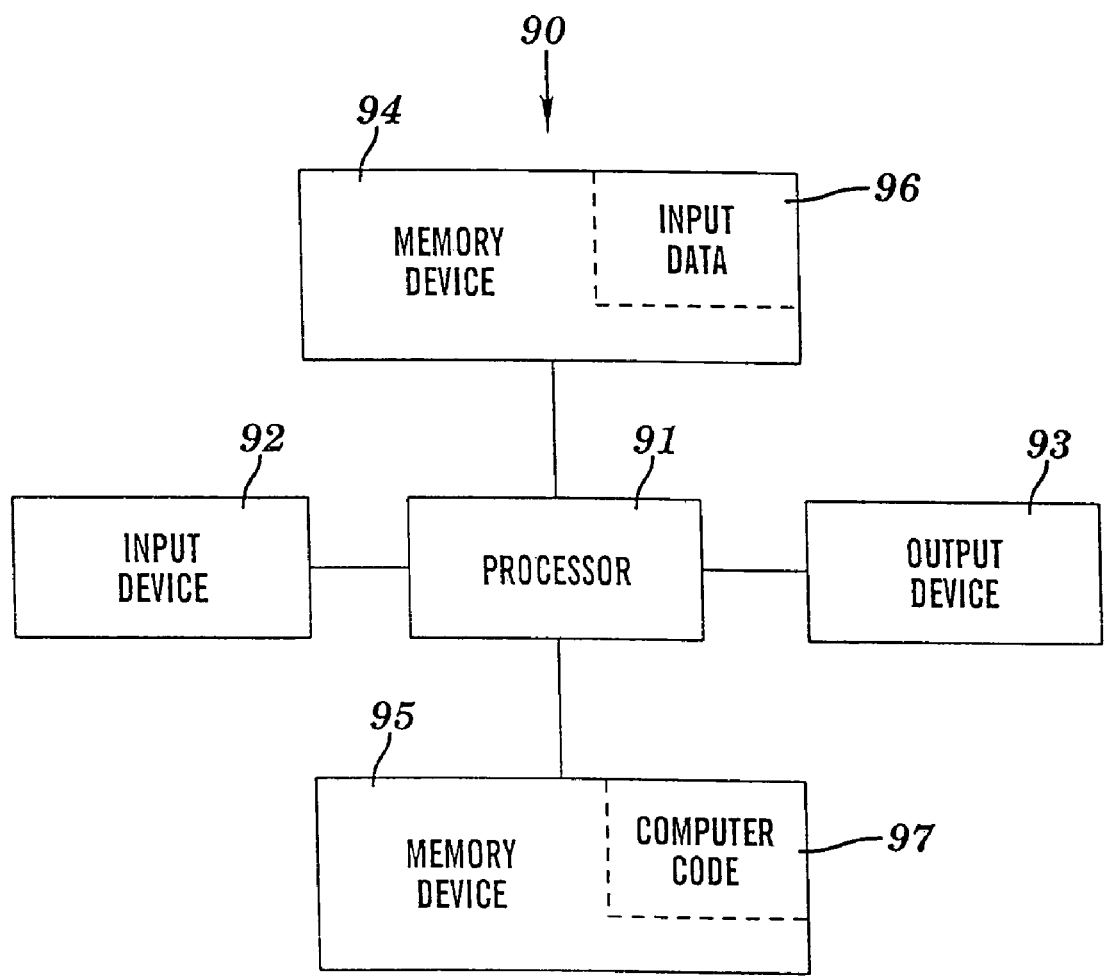
FIG. 25 illustrates a computer system for processing I-BLOCKs used with MCTF and/or for performing overlapped block motion compensation (OBMC) for variable size blocks in the context of motion MCTF scalable video coders, in accordance with embodiments of the present invention.

FIG. 25 illustrates a computer system 90 for processing I-blocks used with MCTF and/or for performing overlapped block motion compensation (OBMC) for variable size blocks in the context of motion MCTF scalable video coders, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, an internal hard disk or disk array, a removable hard disk, a floppy disk, information network, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm or algorithms for processing I-blocks used with MCTF and/or for performing overlapped block motion compensation (OBMC) for variable size blocks in the context of motion MCTF scalable video coders. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 25) may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

While FIG. 25 shows the computer system 90 as a particular configuration of hardware and software, any configuration of hardware and software, as would be known to a person of ordinary skill in the art, may be utilized for the purposes stated supra in conjunction with the particular computer system 90 of FIG. 25. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for processing video frames using a processor, said method comprising the steps of:
    providing a current frame divided into blocks that include at least two differently sized blocks; and
    performing, by the processor, overlapped block motion compensation (OBMC) on each block, said block on which said OBMC is being performed being denoted as a self block, said performing OBMC comprising performing OBMC on the self block with respect to neighbor blocks of the self block, said neighbor blocks consisting of nearest neighbor blocks of the self block, said neighbor blocks comprising a first neighbor block, said performing OBMC on the self block comprising generating a weighting window for the self block and for each of its neighbor blocks.

2. The method of claim 1, wherein the self block and the first neighbor block are each a motion block.

3. The method of claim 1, wherein the self block and the first neighbor block are each an IBLOCK.

4. The method of claim 1, wherein the self block is a motion block, and wherein the first neighbor block is an I-BLOCK.

5. The method of claim 1, wherein the self block is an I-BLOCK, and wherein the first neighbor block is a motion block.

6. The method of claim 1, wherein the self block is an I-BLOCK, and wherein the generated window of the self block consists of first pixel weights and second pixel weights, wherein the first pixel weights are less than what the first pixel weights would have been if the self block had been a motion block, and wherein the second pixel weights are equal to what the second pixel weights would have been if the self block had been the motion block.

7. The method of claim 6, and wherein said generating the weighting window for the self block comprises:
    generating a first weighting window for the self block as if the self block is the motion block; and
    generating the weighting window for the self block from the first weighting window by reducing weights in the first weighting window.

8. The method of claim 6, wherein the generated window of each neighbor block of the self block consists of third pixel weights and fourth pixel weights, wherein the third pixel weights are greater than what the third pixel weights would have been if the self block had been the motion block, and wherein the fourth pixel weights are equal to what the fourth pixel weights would have been if the self block had been the motion block.

9. The method of claim 1, wherein a block size of the first neighbor block differs from a block size of the self block.

10. The method of claim 9, wherein the block size of the first neighbor block exceeds the block size of the self block, wherein said performing OBMC on the self block further comprises shrinking the block size of the first neighbor block to a first portion of the first neighbor block, wherein the first portion of the first neighbor block has a size that is equal to the block size of the self block, and wherein the first portion of the first neighbor block is the only portion of the first neighbor block whose weighting window impacts a predicting of pixel values in the self block during said performing OBMC on the self block.

11. The method of claim 10, wherein the self block and the first neighbor block are each a motion block, and wherein the generated weighting window of the first portion of the first neighbor block consists of bilinearly interpolated weights.

12. The method of claim 9, wherein the block size of the first neighbor block is less than the block size of the self block, wherein said performing OBMC on the self block further comprises shrinking the block size of the self block to a first portion of the self block, wherein the first portion of the self block has a size that is equal to the block size of the first neighbor block, and wherein the first portion of the self block is the only portion of the self block at which a predicting of pixel values is impacted by the weighting window of the first neighbor block during said performing OBMC on the self block.

13. The method of claim 12, wherein the self block is a motion block.

14. The method of claim 13, wherein the first neighboring block is a motion block, wherein the first portion the self block consists of an affected area and an unaffected area, wherein the generated weighting window of the first portion of the self block at the affected area consists of bilinearly interpolated weights, and wherein the generated weighting window of the first portion of the self block at the unaffected area comprises weights that exceed bilinearly interpolated weights.

15. The method of claim 14, wherein first neighboring block consists of an affecting area and an unaffecting area, wherein the affecting area of the first neighboring block is associated with the affected area of the self block, wherein the unaffecting area of the first neighboring block is associated with the unaffected area of the self block, wherein the generated weighting window of the first neighboring block at the affecting area consists of bilinearly interpolated weights, and wherein the generated weighting window of the first neighboring block at the unaffecting area consists of zero weights.

16. The method of claim 13, wherein the first neighboring block is an I-BLOCK, wherein the generated weighting window of the first portion of the self block comprises weights that exceed bilinearly interpolated weights, and wherein the generated weighting window of the first neighboring block consists of zero weights.

17. The method of claim 1, said method further comprising:
for each block in the current frame that has been classified as a motion block: providing at least one motion vector that relates the motion block to a corresponding block in at least one other frame that is earlier and/or later in time than the current frame, wherein the motion vectors collectively constituting an initial set of motion vectors; and
after generating all of the weighting windows: perturbing the initial set of motion vectors in an iterative procedure to compute an improved set of motion vectors in each iteration of said iterative procedure subject to a residual error at each motion block in the current frame at the end of each iteration being less than the residual error at each motion block in the current frame at the beginning of the iteration, and wherein the residual error is calculated through use of the generated weighting windows.

18. The method of claim 17, wherein said perturbing comprises perturbing each motion vector of the initial or improved set of motion vectors at the beginning of each iteration in accordance with a parameter /3 being proportional to a fraction of a pixel unit, and wherein said perturbing includes independently perturbing a horizontal and vertical component of each motion vector in accordance with a.

19. The method of claim 17, wherein the iterative procedure terminates when a predetermined maximum number (a) of iterations has been performed or when a predetermined convergence criteria has been satisfied.

20. The method of claim 1, said method flirt her comprising:
for each block in the current frame that has been classified as a motion block: providing at least one motion vector that relates the motion block to a corresponding block in at least one other frame that is earlier and/or later in time than the current frame; and
performing Motion Compensated Temporal Filtering (MCTF) on the pixels in the current frame and a reference frame to generate a temporal low frame and a temporal high frame, wherein the reference frame is a frame of the at least one other frame.

21. A computer program product, comprising a computer readable medium embodied with a computer program, said computer program comprising an algorithm adapted to implement a method for processing video frames using a processor, said method comprising the steps of:
providing a current frame divided into blocks that include at least two differently sized blocks; and
performing, by the processor, overlapped block motion compensation (OBMC) on each block, said block on which said OBMC is being performed being denoted as a self block, said performing OBMC comprising performing OBMC on the self block with respect to neighbor blocks of the self block, said neighbor blocks consisting of nearest neighbor blocks of the self block, said neighbor blocks comprising a first neighbor block, said performing OBMC on the self block comprising generating a weighting window for the self block and for each of its neighbor blocks.

22. The computer program product of claim 21, wherein the self block and the first neighbor block are each a motion block.

23. The computer program product of claim 21, wherein the self block and the first neighbor block are each an I-BLOCK.

24. The computer program product of claim 21, wherein the self block is a motion block, and wherein the first neighbor block is an I-BLOCK.

25. The computer program product of claim 21, wherein the self block is an I-BLOCK, and wherein the first neighbor block is a motion block.

26. The computer program product of claim 21, wherein the self block is an I-BLOCK, and wherein the generated window of the self block consists of first pixel weights and second pixel weights, wherein the first pixel weights are less than what the first pixel weights would have been if the self block had been a motion block, and wherein the second pixel weights are equal to what the second pixel weights would have been if the self block had been the motion block.

27. The computer program product of claim 26, and wherein said generating the weighting window for the self block comprises:
generating a first weighting window for the self block as if the self block is the motion block; and
generating the weighting window for the self block from the first weighting window by reducing weights in the first weighting window.

28. The computer program product of claim 26, wherein the generated window of each neighbor block of the self block consists of third pixel weights and fourth pixel weights, wherein the third pixel weights are greater than what the third pixel weights would have been if the self block had been the motion block, and wherein the fourth pixel weights are equal to what the fourth pixel weights would have been if the self block had been the motion block.

29. The computer program product of claim 21, wherein a block size of the first neighbor block differs from a block size of the self block.

30. The computer program product of claim 29, wherein the block size of the first neighbor block exceeds the block size of the self block, wherein said performing OBMC on the self block further comprises shrinking the block size of the first neighbor block to a first portion of the first neighbor block, wherein the first portion of the first neighbor block has a size that is equal to the block size of the self block, and wherein the first portion of the first neighbor block is the only portion of the first neighbor block whose weighting window impacts a predicting of pixel values in the self block during said performing OBMC on the self block.

31. The computer program product of claim 30, wherein the self block and the first neighbor block are each a motion block, and wherein the generated weighting window of the first portion of the first neighbor block consists of bilinearly interpolated weights.

32. The computer program product of claim 29, wherein the block size of the first neighbor block is less than the block size of the self block, wherein said performing OBMC on the self block further comprises shrinking the block size of the self block to a first portion of the self block, wherein the first portion of the self block has a size that is equal to the block size of the first neighbor block, and wherein the first portion of the self block is the only portion of the self block at which a predicting of pixel values is impacted by the weighting window of the first neighbor block during said performing OBMC on the self block.

33. The computer program product of claim 32, wherein the self block is a motion block.

34. The computer program product of claim 33, wherein the first neighboring block is a motion block, wherein the first portion the self block consists of an affected area and an unaffected area, wherein the generated weighting window of the first portion of the self block at the affected area consists of bilinearly interpolated weights, and wherein the generated weighting window of the first portion of the self block at the unaffected area comprises weights that exceed bilinearly interpolated weights.

35. The computer program product of claim 34, wherein first neighboring block consists of an affecting area and an unaffecting area, wherein the affecting area of the first neighboring block is associated with the affected area of the self block, wherein the unaffecting area of the first neighboring block is associated with the unaffected area of the self block, wherein the generated weighting window of the first neighboring block at the affecting area consists of bilinearly interpolated weights, and wherein the generated weighting window of the first neighboring block at the unaffecting area consists of zero weights.

36. The computer program product of claim 33, wherein the first neighboring block is an IBLOCK, wherein the generated weighting window of the first portion of the self block comprises weights that exceed bilinearly interpolated weights, and wherein the generated weighting window of the first neighboring block consists of zero weights.

37. The computer program product of claim 21, said method further comprising:
for each block in the current frame that has been classified as a motion block: providing at least one motion vector that relates the motion block to a corresponding block in at least one other frame that is earlier and/or later in time than the current frame, wherein the motion vectors collectively constituting an initial set of motion vectors; and
after generating all of the weighting windows: perturbing the initial set of motion vectors in an iterative procedure to compute an improved set of motion vectors in each iteration of said iterative procedure subject to a residual error at each motion block in the current frame at the end of each iteration being less than the residual error at each motion block in the current frame at the beginning of the iteration, and wherein the residual error is calculated through use of the generated weighting windows.

38. The computer program product of claim 37, wherein said perturbing comprises perturbing each motion vector of the initial or improved set of motion vectors at the beginning of each iteration in accordance with a parameter (3 being proportional to a fraction of a pixel unit, and wherein said perturbing includes independently perturbing a horizontal and vertical component of each motion vector in accordance with (3.

39. The computer program product of claim 37, wherein the iterative procedure terminates when a predetermined maximum number (a) of iterations has been performed or when a predetermined convergence criteria has been satisfied.

40. The computer program product of claim 21, said method further comprising:
for each block in the current frame that has been classified as a motion block: providing at least one motion vector that relates the motion block to a corresponding block in at least one other frame that is earlier and/or later in time than the current frame; and
performing Motion Compensated Temporal Filtering (MCTF) on the pixels in the current frame and a reference frame to generate a temporal low frame and a temporal high frame, wherein the reference frame is a frame of the at least one other frame.

41. A system comprising a processor, the processor implementing a method for processing video frames, said method comprising:
providing a current frame divided into blocks that include at least two differently sized blocks; and
performing, by the processor, overlapped block motion compensation (OBMC) on each block, said block on which said OBMC is being performed being denoted as a self block, said performing OBMC comprising performing OBMC on the self block with respect to neighbor blocks of the self block, said neighbor blocks consisting of nearest neighbor blocks of the self block, said neighbor blocks comprising a first neighbor block, said performing OBMC on the self block comprising generating a weighting window for the self block and for each of its neighbor blocks.

42. The computer system of claim 41, wherein the self block and the first neighbor block are each a motion block.

43. The computer system of claim 41, wherein the self block and the first neighbor block are each an I-BLOCK.

44. The computer system of claim 41, wherein the self block is a motion block, and wherein the first neighbor block is an I-BLOCK.

45. The computer system of claim 41, wherein the self block is an I-BLOCK, and wherein the first neighbor block is a motion block.

46. The computer system of claim 41, wherein the self block is an I-BLOCK, and wherein the generated window of the self block consists of first pixel weights and second pixel weights, wherein the first pixel weights are less than what the first pixel weights would have been if the self block had been a motion block, and wherein the second pixel weights are equal to what the second pixel weights would have been if the self block had been the motion block.

47. The computer system of claim 46, and wherein said generating the weighting window for the self block comprises:
generating a first weighting window for the self block as if the self block is the motion block; and
generating the weighting window for the self block from the first weighting window by reducing weights in the first weighting window.

48. The computer system of claim 46, wherein the generated window of each neighbor block of the self block consists of third pixel weights and fourth pixel weights, wherein the third pixel weights are greater than what the third pixel weights would have been if the self block had been the motion block, and wherein the fourth pixel weights are equal to what the fourth pixel weights would have been if the self block had been the motion block.

49. The computer system of claim 41, wherein a block size of the first neighbor block differs from a block size of the self block.

50. The computer system of claim 49, wherein the block size of the first neighbor block exceeds the block size of the self block, wherein said performing OBMC on the self block further comprises shrinking the block size of the first neighbor block to a first portion of the first neighbor block, wherein the first portion of the first neighbor block has a size that is equal to the block size of the self block, and wherein the first portion of the first neighbor block is the only portion of the first neighbor block whose weighting window impacts a predicting of pixel values in the self block during said performing OBMC on the self block.

51. The computer system of claim 50, wherein the self block and the first neighbor block are each a motion block, and wherein the generated weighting window of the first portion of the first neighbor block consists of bilinearly interpolated weights.

52. The computer system of claim 49, wherein the block size of the first neighbor block is less than the block size of the self block, wherein said performing OBMC on the self block further comprises shrinking the block size of the self block to a first portion of the self block, wherein the first portion of the self block has a size that is equal to the block size of the first neighbor block, and wherein the first portion of the self block is the only portion of the self block at which a predicting of pixel values is impacted by the weighting window of the first neighbor block during said performing OBMC on the self block.

53. The computer system of claim 52, wherein the self block is a motion block.

54. The computer system of claim 53, wherein the first neighboring block is a motion block, wherein the first portion the self block consists of an affected area and an unaffected area, wherein the generated weighting window of the first portion of the self block at the affected area consists of bilinearly interpolated weights, and wherein the generated weighting window of the first portion of the self block at the unaffected area comprises weights that exceed bilinearly interpolated weights.

55. The computer system of claim 54, wherein first neighboring block consists of an affecting area and an unaffecting area, wherein the affecting area of the first neighboring block is associated with the affected area of the self block, wherein the unaffecting area of the first neighboring block is associated with the unaffected area of the self block, wherein the generated weighting window of the first neighboring block at the affecting area consists of bilinearly interpolated weights, and wherein the generated weighting window of the first neighboring block at the unaffecting area consists of zero weights.

56. The computer system of claim 53, wherein the first neighboring block is an I-BLOCK, wherein the generated weighting window of the first portion of the self block comprises weights that exceed bilinearly interpolated weights, and wherein the generated weighting window of the first neighboring block consists of zero weights.

57. The computer system of claim 41, said method further comprising:
for each block in the current frame that has been classified as a motion block: providing at least one motion vector that relates the motion block to a corresponding block in at least one other frame that is earlier and/or later in time than the current frame, wherein the motion vectors collectively constituting an initial set of motion vectors; and
after generating all of the weighting windows: perturbing the initial set of motion vectors in an iterative procedure to compute an improved set of motion vectors in each iteration of said iterative procedure subject to a residual error at each motion block in the current frame at the end of each iteration being less than the residual error at each motion block in the current frame at the beginning of the iteration, and wherein the residual error is calculated through use of the generated weighting windows.

58. The computer system of claim 57, wherein said perturbing comprises perturbing each motion vector of the initial or improved set of motion vectors at the beginning of each iteration in accordance with a parameter 3 being proportional to a fraction of a pixel unit, and wherein said perturbing includes independently perturbing a horizontal and vertical component of each motion vector in accordance with (3.

59. The computer system of claim 57, wherein the iterative procedure terminates when a predetermined maximum number (a) of iterations has been performed or when a predetermined convergence criteria has been satisfied.

60. The computer system of claim 41, said method further comprising:
for each block in the current frame that has been classified as a motion block: providing at least one motion vector that relates the motion block to a corresponding block in at least one other frame that is earlier and/or later in time than the current frame; and
performing Motion Compensated Temporal Filtering (MCTF) on the pixels in the current frame and a reference frame to generate a temporal low frame and a temporal high frame, wherein the reference frame is a frame of the at least one other frame.

* * * * *